(12) United States Patent
Harada et al.

(10) Patent No.: US 9,355,796 B2
(45) Date of Patent: May 31, 2016

(54) SWITCH

(75) Inventors: Takashi Harada, Tokyo (JP); Masato Kawahigashi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 283 days.

(21) Appl. No.: 13/991,189

(22) PCT Filed: Jan. 25, 2011

(86) PCT No.: PCT/JP2011/051330
§ 371 (c)(1),
(2), (4) Date: Jun. 3, 2013

(87) PCT Pub. No.: WO2012/101758
PCT Pub. Date: Aug. 2, 2012

(65) Prior Publication Data
US 2013/0248341 A1 Sep. 26, 2013

(51) Int. Cl.
*H01H 31/02* (2006.01)
*H01H 31/28* (2006.01)
(Continued)

(52) U.S. Cl.
CPC ............... *H01H 15/04* (2013.01); *H01H 3/42* (2013.01); *H01H 31/003* (2013.01); *H01H 31/32* (2013.01); *H01H 33/64* (2013.01); *H02B 13/035* (2013.01); *H02B 13/075* (2013.01)

(58) Field of Classification Search
CPC ....... H01H 15/04; H01H 3/42; H01H 31/003; H01H 31/32; H02B 13/075; H02B 13/035
See application file for complete search history.

(56) References Cited

U.S. PATENT DOCUMENTS 3,665,135 A 5/1972 Boersma et al.
5,841,087 A 11/1998 Füchsle et al.
(Continued)

FOREIGN PATENT DOCUMENTS

JP 5-65036 U 8/1993
JP 8-214423 A 8/1996
(Continued)

OTHER PUBLICATIONS

Partial Supplementary European Search Report issued on Nov. 26, 2014, by the European Patent Office in corresponding European Patent Application No. 11857331.0-1808. (7 pgs).
(Continued)

*Primary Examiner* — Renee S Luebke
*Assistant Examiner* — Lheiren Mae A Caroc
(74) *Attorney, Agent, or Firm* — Buchanan Ingersoll & Rooney PC

(57) ABSTRACT

A switch includes a fixed contact fixed in a container in which an insulating gas is filled and a movable contact provided to be reciprocatingly movable with respect to the fixed contact and configured to come into contact with and separate from the fixed contact. The switch further comprises a pin provided in the container and configured to move along an arcuate track. A groove in which the pin is fit and is movable is formed in the movable contact. The groove includes a linear groove linearly extending substantially perpendicularly to a moving direction of the movable contact and substantially in parallel to a plane including the moving track of the pin and an arcuate groove that communicates with the linear groove and overlaps the moving track of the pin. The pin moves in the linear groove, whereby the movable contact reciprocatingly moves.

7 Claims, 24 Drawing Sheets

(51) Int. Cl.
  *H01H 31/32* (2006.01)
  *H01H 15/04* (2006.01)
  *H02B 13/035* (2006.01)
  *H02B 13/075* (2006.01)
  *H01H 31/00* (2006.01)
  *H01H 33/64* (2006.01)
  *H01H 3/42* (2006.01)

(56) References Cited

U.S. PATENT DOCUMENTS 8,829,371 B2 * 9/2014 Goschel ............... H01H 31/003
  200/17 R
9,147,540 B2 * 9/2015 Lee ........................ H01H 33/42
2010/0089875 A1 4/2010 Treier

FOREIGN PATENT DOCUMENTS

| JP | 9-147698 A | 6/1997 |
| JP | 10-134679 A | 5/1998 |
| JP | 10-321090 A | 12/1998 |
| JP | 2002-140964 A | 5/2002 |

OTHER PUBLICATIONS

International Search Report (PCT/ISA/210) issued on Apr. 19, 2011, by the Japanese Patent Office as the International Searching Authority for International Application No. PCT/JP2011/051330.
Written Opinion (PCT/ISA/237) issued on Apr. 19, 2011, by the Japanese Patent Office as the International Searching Authority for International Application No. PCT/JP2011/051330.
Extended European Search Report issued on Apr. 24, 2015, by the European Patent Office in corresponding European Patent Application No. 11857331.0-1808. (11 pages).
Chinese Office Action dated Feb. 3, 2015 issued in corresponding Chinese Patent Appln. No. 201180065800.6, with English translation (8 pages).
Second Office Action issued on Sep. 30, 2015, by the Chinese Patent Office in corresponding Chinese Patent Application No. 201180065800.6 (12 pages).

* cited by examiner

SWITCH

FIELD

The present invention relates to a switch such as a gas-insulated switching device and, more particularly, to a switch including a movable contact and a fixed contact.

BACKGROUND

A switch has been used that reciprocatingly moves a movable contact in a container filled with an insulating gas or the like to bring the movable contact into contact with and separate the movable contact from a fixed contact fixed to the same container. For example, Patent Literature 1 discloses a technology for converting the motion of a driving roller, which moves around a main shaft according to the rotation of the main shaft, into a liner motion using a driving plate in which a cutout is formed and reciprocatingly moving a movable contact.

CITATION LIST

Patent Literature

Patent Literature 1: Japanese Patent Application Laid-open No. 10-321090

SUMMARY

Technical Problem

However, according to the related art, if the driving roller comes off the cutout, the driving plate can move freely. Therefore, it is likely that the movable contact malfunctions. If the position of the driving plate shifts while the driving roller is off the cutout, in some case, the driving roller is not properly fit in the cutout and the movable contact cannot be appropriately actuated.

The present invention has been devised in view of the above and it is an object of the present invention to stabilize the reciprocating movement of the movable contact and obtain a switch in which a malfunction and the like less easily occur.

Solution to Problem

In order to solve the aforementioned problems, a switch according to one aspect of the present invention is configured to include: a fixed contact fixed in a container in which an insulating gas is filled; and a movable contact provided to be reciprocatingly movable with respect to the fixed contact and configured to come into contact with and separate from the fixed contact, wherein the switch further comprises a pin provided in the container and configured to move along an arcuate track, a groove in which the pin is fit and is movable is formed in the movable contact, the groove includes a linear groove linearly extending substantially perpendicularly to a moving direction of the movable contact and substantially in parallel to a plane including the moving track of the pin and an arcuate groove that communicates with the linear groove and overlaps the moving track of the pin, and the pin moves in the linear groove, whereby the movable contact reciprocatingly moves.

Advantageous Effects of Invention

According to the present invention, there is an effect that, because the pin moves in the linear groove, it is possible to reciprocatingly move the movable contact and, when the pin moves in the arcuate groove, which overlaps the moving track, because the movable contact does not reciprocatingly move and the pin does not come off the groove even while the pin is moving the arcuate groove, it is possible to stabilize the reciprocating movement of the movable contact and suppress a malfunction of the movable contact.

BRIEF DESCRIPTION OF DRAWINGS

FIG. 3-1 is a diagram of a schematic configuration of a lever member included in the three-point disconnecting switch shown in FIG. 1.

FIG. 3-2 is an arrow sectional view taken along line B-B shown in FIG. 3-1.

FIG. 36-1 is a diagram of a schematic configuration of a lever member included in the three-point disconnecting switch according to the fourth embodiment of the present invention.

FIG. 36-2 is an arrow sectional view taken along line K-K shown in FIG. 36-1.

DESCRIPTION OF EMBODIMENTS

Three-point disconnecting switches functioning as switches according to embodiments of the present invention are explained in detail below with reference to the drawings. The present invention is not limited by the embodiments.

First Embodiment.

Figure 1:
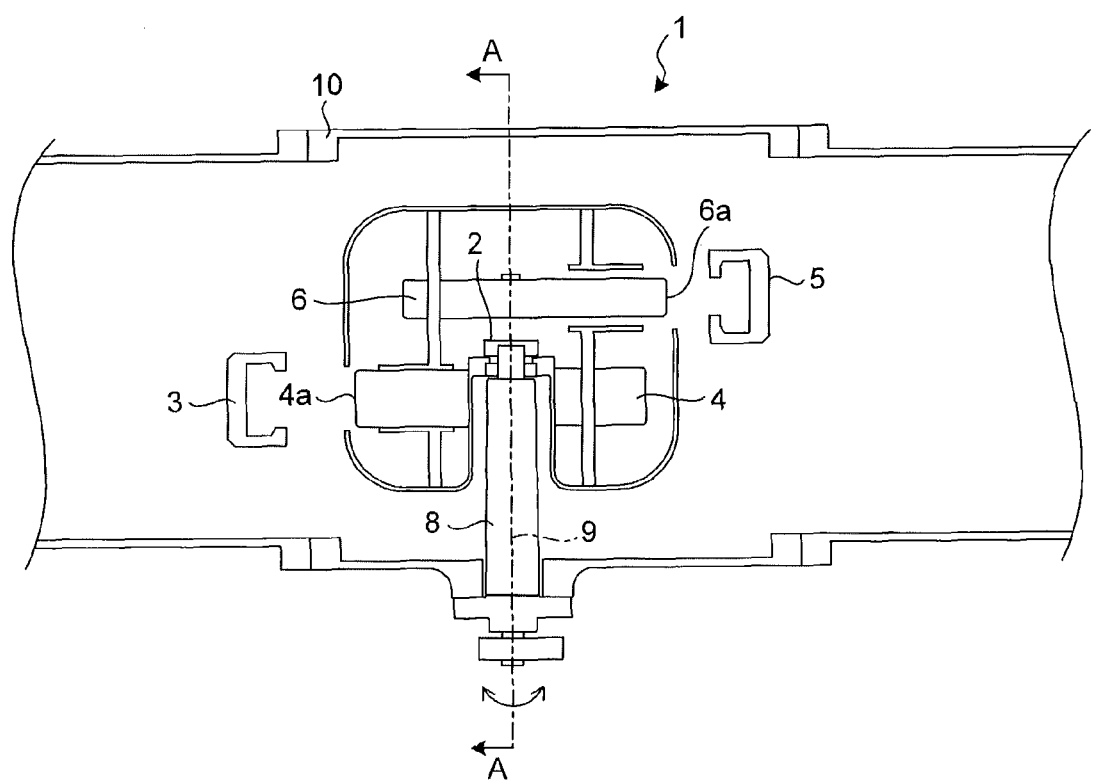
FIG. 1 is a plan sectional view of a schematic configuration of a three-point disconnecting switch according to a first embodiment of the present invention.
Figure 2:
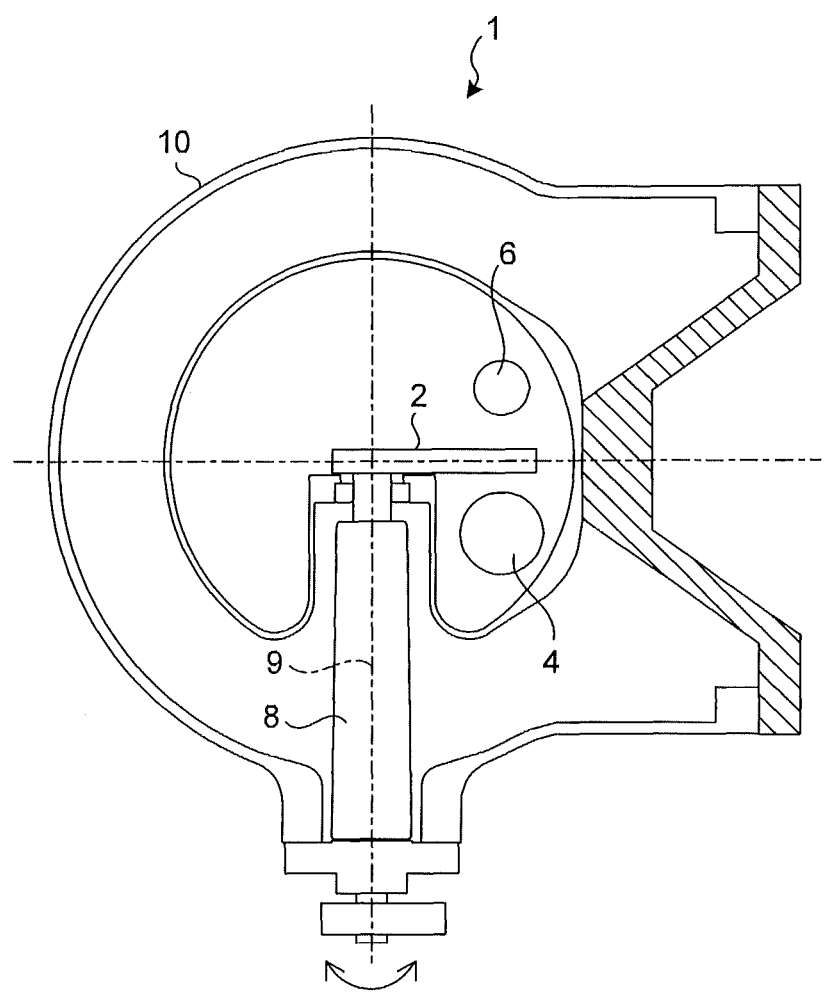
FIG. 2 is an arrow sectional view taken along line A-A shown in FIG. 1.

FIG. 1 is a plan sectional view of a schematic configuration of a three-point disconnecting switch functioning as a switch according to a first embodiment of the present invention. FIG. 2 is an arrow sectional view taken along line A-A shown in FIG. 1. A three-point disconnecting switch 1 functioning as a switch includes, on the inside of a container 10, a lever member 2, a disconnecting-side fixed contact 3, a disconnecting-side movable contact (a first movable contact) 4, an earth-side fixed contact 5, and an earth-side movable contact (a second movable contact) 6. In the container 10, an insulating gas such as a sulfur hexafluoride gas is filled in a sealed inner space.

Figures 1, 3:
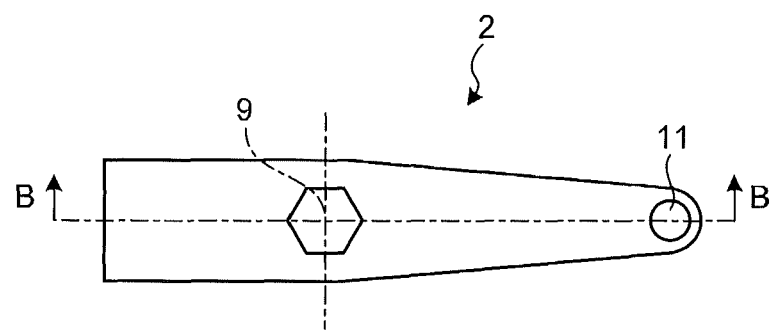
Figures 2, 3:
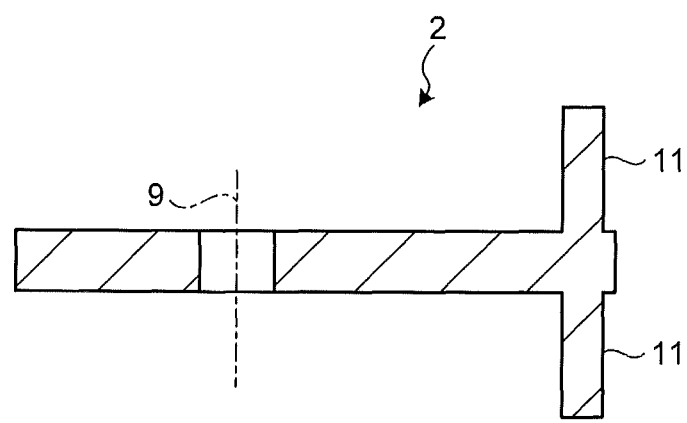

FIG. 3-1 is a diagram of a schematic configuration of the lever member 2 included in the three-point disconnecting switch 1 shown in FIG. 1. FIG. 3-2 is an arrow sectional view taken along line B-B shown in FIG. 3-1. As shown in FIGS. 1 and 2, an insulating rod 8 extending from the outside of the container 10 is connected to the lever member 2. When an operation section provided on the outside of the container 10 is operated, the insulating rod 8 rotates about a rotation axis 9. The lever member 2 rotates about the rotation axis 9 according to the rotation of the insulating rod 8.

A pin 11 is formed in the lever member 2. The pin 11 is formed to pierce through the lever member 2 and project to both surface sides of the lever member 2. When the lever member 2 rotates, the pin 11 moves along an arcuate track centering on the rotation axis 9 on the inside of the container 10.

Figure 4:
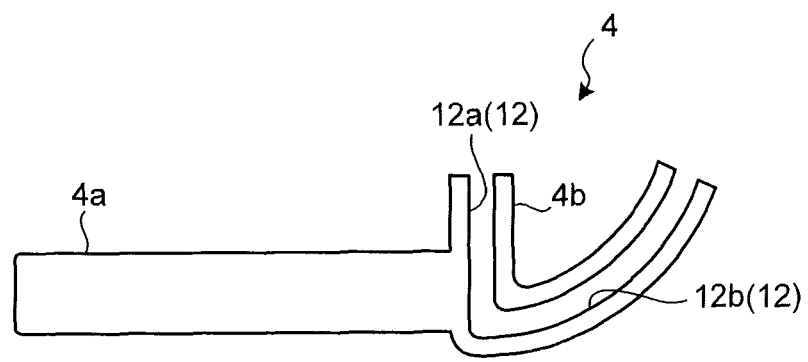
FIG. 4 is a diagram of a schematic configuration of a disconnecting-side movable contact included in the three-point disconnecting switch shown in FIG. 1.

FIG. 4 is a diagram of a schematic configuration of the disconnecting-side movable contact 4 included in the three-point disconnecting switch 1 shown in FIG. 1. The disconnecting-side movable contact 4 includes a contact section 4a assuming a bar-like shape and a guide section 4b in which a groove (a first groove) 12 is formed. The disconnecting-side movable contact 4 is enabled to reciprocatingly move in the container 10. A direction in which the disconnecting-side movable contact 4 reciprocatingly moves is regulated to a direction in which the distal end of the contact section 4a moves toward the disconnecting-side fixed contact 3 by a not-shown regulating section. According to the reciprocating movement, the disconnecting-side movable contact 4 moves to a position where the contact section 4a comes into contact with the disconnecting-side fixed contact 3 and a position where the contact section 4a separates from the disconnecting-side fixed contact 3.

When the disconnecting-side movable contact 4 and the disconnecting-side fixed contact 3 come into contact with each other, it is possible to connect a bus side and a line side and cause the bus side and the line side to conduct. When the disconnecting-side movable contact 4 and the disconnecting-side fixed contact 3 separate from each other, it is possible to disconnect the bus side and the line side. That is, the disconnecting-side movable contact 4 and the disconnecting-side fixed contact 3 function as a disconnecting switch (DS).

The guide section 4b is formed at an end of the contact section 4a. The end where the guide section 4b is formed is an end on the opposite side of an end where the contact section 4a is in contact with the disconnecting-side fixed contact 3. A groove 12 is formed in the guide section 4b. The pin 11 formed in the lever member 2 is fit in the groove 12. The groove 12 is formed at a width for enabling the pin 11 fit in the groove 12 to move.

The groove 12 includes a linear groove 12a and an arcuate groove 12b. The linear groove 12a and the arcuate groove 12b are formed to communicate with each other. The linear groove 12a is formed in a shape linearly extending substantially perpendicularly to the moving direction of the disconnecting-side movable contact 4 and substantially in parallel to a plane including the moving track of the pin 11 in a state in which the disconnecting-side movable contact 4 is incorporated in the container 10.

The arcuate groove 12b is formed in an arcuate shape substantially overlapping the moving track of the pin 11 in a state in which the disconnecting-side movable contact 4 is incorporated in the container 10. The linear groove 12a is formed in a region on the inner side of an arc drawn by the arcuate groove 12b.

Figure 5:
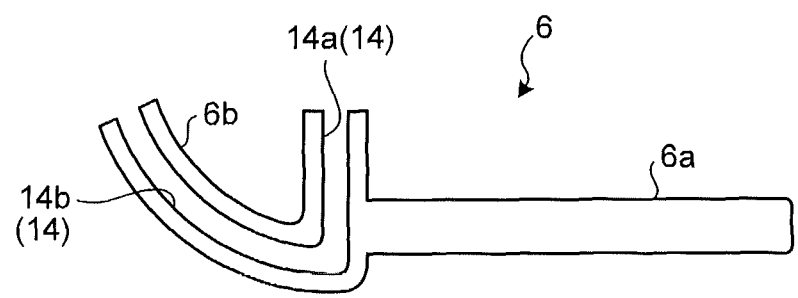
FIG. 5 is a diagram of a schematic configuration of an earth-side movable contact included in the three-point disconnecting switch shown in FIG. 1.

FIG. 5 is a diagram of a schematic configuration of the earth-side movable contact included in the three-point disconnecting switch shown in FIG. 1. The earth-side movable contact 6 includes a contact section 6a assuming a bar-like shape and a guide section 6b in which a groove (a second groove) 14 is formed. The earth-side movable contact 6 is enabled to reciprocatingly move in the container 10. A direction in which the earth-side movable contact 6 reciprocatingly moves is regulated to a direction in which the distal end of the contact section 6a moves toward the earth-side fixed contact 5 by a not-shown regulating section. According to the reciprocating movement, the earth-side movable contact 6 moves to a position where the contact section 6a comes into contact with the earth-side fixed contact 5 and a position where the contact section 6a separates from the earth-side fixed contact 5.

When the earth-side movable contact 6 and the earth-side fixed contact 5 come into contact with each other, it is possible to earth the three-point disconnecting switch 1. That is, the earth-side movable contact 6 and the earth-side fixed contact 5 function as an earth switch (ES).

The guide section 6b is formed at an end of the contact section 6a. The end where the guide section 6b is formed is an end on the opposite side of an end where the contact section 6a is in contact with the earth-side fixed contact 5. A groove 14 is formed in the guide section 6b. The pin 11 formed in the lever member 2 is fit in the groove 14. The groove 14 is formed at a width for enabling the pin 11 fit in the groove 14 to move.

The groove 14 includes a linear groove 14a and an arcuate groove 14b. The linear groove 14a and the arcuate groove 14b are formed to communicate with each other. The linear groove 14a is formed in a shape linearly extending substantially perpendicularly to the moving direction of the earth-side movable contact 6 and substantially in parallel to a plane including the moving track of the pin 11 in a state in which the earth-side movable contact 6 is incorporated in the container 10.

The arcuate groove 14b is formed in an arcuate shape substantially overlapping the moving track of the pin 11 in a state in which the earth-side movable contact 6 is incorporated in the container 10. The linear groove 14a is formed in a region on the inner side of an arc drawn by the arcuate groove 14b.

Figure 6:
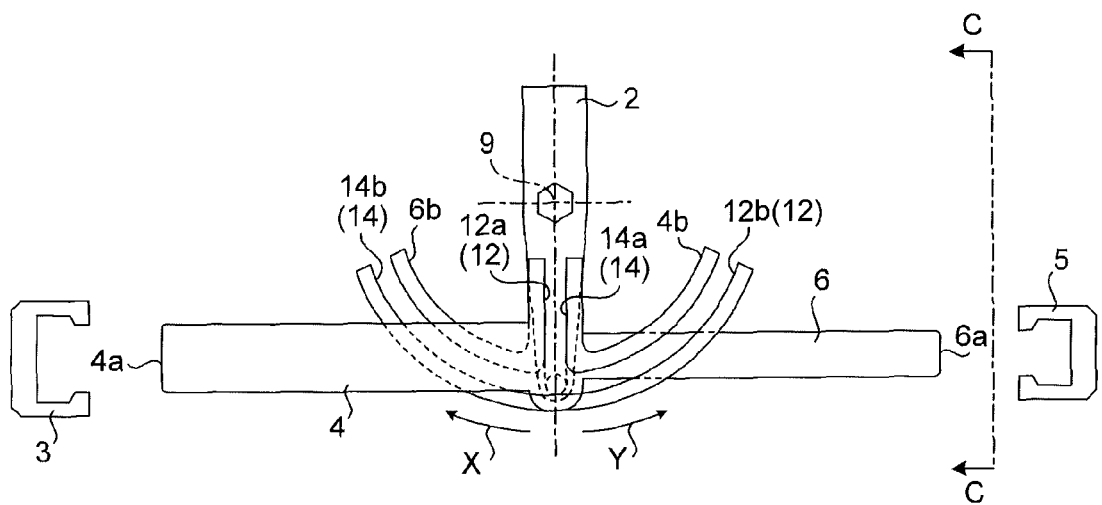
FIG. 6 is a diagram of a state in which the movable contacts and the lever member are incorporated in a container and a diagram of a state in which both of the disconnecting-side movable contact and the earth-side movable contact are separated from fixed contacts.
Figure 7:
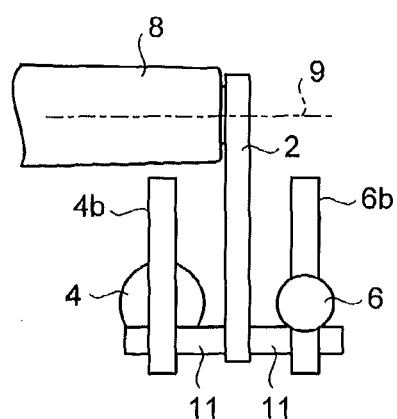
FIG. 7 is an arrow view taken along line C-C shown in FIG. 6.

FIG. 6 is a diagram of a state in which the movable contacts 4 and 6 and the lever member 2 are incorporated in the container 10 and is a diagram of a state in which both of the disconnecting-side movable contact 4 and the earth-side movable contact 6 are separated from the fixed contacts 3 and 5. FIG. 7 is an arrow view taken along line C-C shown in FIG. 6. The state in which both of the disconnecting-side movable contact 4 and the earth-side movable contact 6 are separated from the fixed contacts 3 and 5 as shown in FIG. 6 is referred to as neutral state as well in the following explanation.

As shown in FIG. 7, the lever member 2 is arranged between the disconnecting-side movable contact 4 and the earth-side movable contact 6. The disconnecting-side movable contact 4 and the earth-side movable contact 6 are arranged such that the contact sections 4a and 6a thereof face directions about 180 degrees different from each other.

The pin 11 formed to project to both the surfaces of the lever member 2 is fit in each of the groove 12 of the disconnecting-side movable contact 4 and the groove 14 of the earth-side movable contact 6. As shown in FIG. 6, when the movable contacts 4 and 6 are present in the neutral position, the pin 11 is located in the vicinity of a boundary of the linear grooves 12a and 14a and the arcuate grooves 12b and 14b. The arcuate groove 14b overlaps a moving track of the pin 11 moving in a direction indicated by an arrow X from the neutral state. The arcuate groove 12b overlaps a moving track of the pin 11 moving in a direction indicated by an arrow Y from the neutral position.

Figure 8:
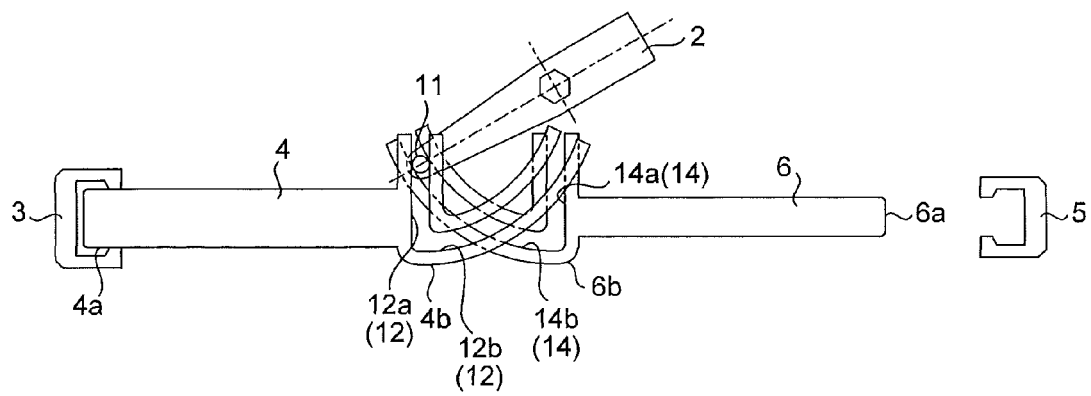
FIG. 8 is a diagram of a state in which the movable contacts and the lever member are incorporated in the container and a diagram of a state in which the disconnecting-side movable contact is in contact with a disconnecting-side fixed contact.

FIG. 8 is a diagram of a state in which the movable contacts 4 and 6 and the lever member 2 are incorporated in the container 10 and a diagram of a state in which the disconnecting-side movable contact 4 is in contact with the disconnecting-side fixed contact 3. The state in which the disconnecting-side movable contact 4 and the disconnecting-side fixed contact 3 are in contact with each other and the earth-side movable contact 6 and the earth-side fixed contact 5 are separated from each other as shown in FIG. 8 is referred to as DS input state as well in the following explanation.

When the insulating rod 8 and the lever member 2 are rotated from the neutral state shown in FIG. 7 and the pin 11 moves in the direction indicated by the arrow X, the disconnecting-side movable contact 4 moves in a direction toward the disconnecting-side fixed contact 3. Because the pin 11 moves on an arcuate track, a component of the movement can be divided into the direction toward the disconnecting-side fixed contact 3 and a direction perpendicular to the direction (a direction in which the linear groove 12a extends). The pin 11 moves in the linear groove 12a according to the movement component in the direction in which the linear groove 12a extends. A moving direction of the pin 11 in the linear groove 12a in this case is a direction away from the arcuate groove 12b.

On the other hand, the pin 11 pushes the sidewall of the linear groove 12a to the direction toward the disconnecting-side fixed contact 3. Therefore, the disconnecting-side movable contact 4 moves in the direction toward the disconnecting-side fixed contact 3. When the disconnecting-side movable contact 4 moves, as shown in FIG. 8, the disconnecting-side movable contact 4 and the disconnecting-side fixed contact 3 come into contact with each other and the bus side and the line side are caused to conduct.

When the pin 11 moves in the direction indicated by the arrow X from the neutral state, the pin 11 moves in the arcuate groove 14b of the earth-side movable contact 6. As explained above, because the arcuate groove 14b overlaps the moving track of the pin 11 moving in the direction indicated by the arrow X, the pin 11 hardly interferes with a sidewall of the arcuate groove 14b in a process in which the neutral state changes to the DS input state. Therefore, the earth-side movable contact 6 hardly moves in the process in which the neutral state changes to the DS input state. The state in which the earth-side movable contact 6 and the earth-side fixed contact 5 are kept separated from each other is maintained.

Figure 9:
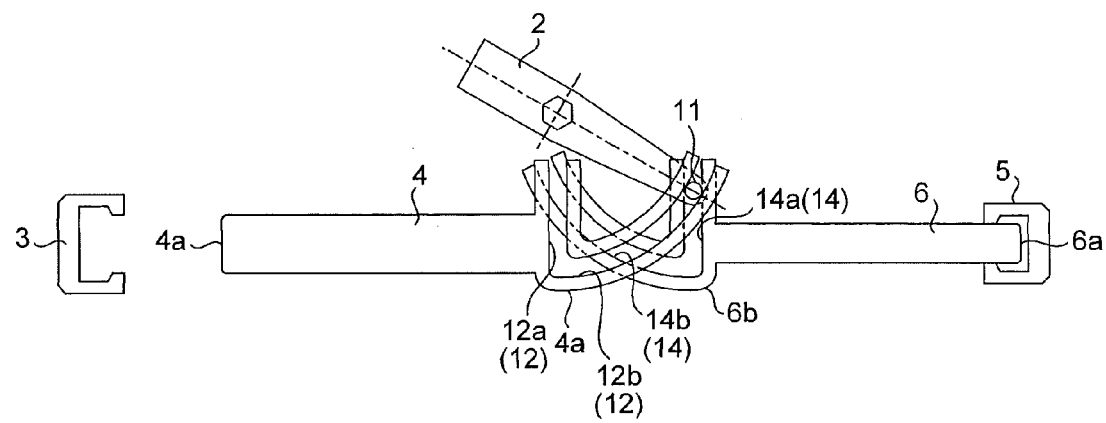
FIG. 9 is a diagram of a state in which the movable contacts and the lever member are incorporated in the container and a diagram of a state in which the earth-side movable contact is in contact with an earth-side fixed contact.

FIG. 9 is a diagram of a state in which the movable contacts 4 and 6 and the lever member 2 are incorporated in the container 10 and a diagram of a state in which the earth-side movable contact 6 is in contact with the earth-side fixed contact 5. The state in which the earth-side movable contact 6 and the earth-side fixed contact 5 are in contact with each other and the disconnecting-side movable contact 4 and the disconnecting-side fixed contact 3 are separated from each other as shown in FIG. 9 is hereinafter referred to as ES input state as well in the following explanation.

When the insulating rod 8 and the lever member 2 are rotated from the neutral state shown in FIG. 7 and the pin 11 moves in the direction indicated by the arrow Y, the earth-side movable contact 6 moves in a direction toward the earth-side fixed contact 5. Because the pin 11 moves on an arcuate track, a component of the movement can be divided into the direction toward the earth-side fixed contact 5 and a direction perpendicular to the direction (a direction in which the linear groove 14a extends). The pin 11 moves in the linear groove 14a according to the movement component in the direction in which the linear groove 14a extends. A moving direction of the pin 11 in the linear groove 14a in this case is a direction away from the arcuate groove 14b.

On the other hand, the pin 11 pushes the sidewall of the linear groove 14a to the direction toward the earth-side fixed contact 5. Therefore, the earth-side movable contact 6 moves in the direction toward the earth-side fixed contact 5. When the earth-side movable contact 6 moves, as shown in FIG. 9, the earth-side movable contact 6 and the earth-side fixed contact 5 come into contact with each other and the three-point disconnecting switch 1 is earthed.

When the pin 11 moves in the direction indicated by the arrow Y from the neutral state, the pin 11 moves in the arcuate groove 12b of the disconnecting-side movable contact 4. As explained above, because the arcuate groove 12b overlaps the moving track of the pin 11 moving in the direction indicated by the arrow Y, the pin 11 hardly interferes with a sidewall of the arcuate groove 12b in a process in which the neutral state changes to the ES input state. Therefore, the disconnecting-side movable contact 4 hardly moves in the process in which the neutral state changes to the ES input state. The state in which the disconnecting-side movable contact 4 and the disconnecting-side fixed contact 3 are kept separated from each other is maintained.

As explained above, in the three-point disconnecting switch 1 according to the first embodiment, it is possible to select the DS input state and the ES input state as appropriate after selecting the neutral state by operating the insulating rod 8 to rotate the lever member 2. When the DS input state and the ES input state are changed, while one of the movable contacts 4 and 6 is moved by the pin 11 that passes the linear groove 12a or 14a, the pin 11 passes the arcuate groove 12b or 14b of the other movable contact 4 or 6 while hardly interfering with the sidewall of the arcuate groove 12b or 14b. Therefore, the disconnecting-side movable contact 4 and the earth-side movable contact 6 alternately move. It is possible to prevent, without providing a special device or mechanism, both of the disconnecting-side movable contact 4 and the earth-side movable contact 6 from simultaneously coming into contact with the fixed contacts 3 and 5.

It is possible to move the two movable contacts 4 and 6 by rotating the one lever member 2. Therefore, it is possible to realize a reduction in the number of components compared with the number of components including actuating mechanisms respectively provided in the movable contacts 4 and 6. According to the reduction in the number of components, it is possible to realize a reduction in the size of the three-point disconnecting switch 1. In changing the neutral state, the DS input state, and the ES input state, a user of the three-point disconnecting switch 1 only has to operate the one insulating rod 8. Therefore, it is possible to realize improvement of convenience of use of the three-point disconnecting switch 1.

The movable contacts 4 and 6 are reciprocatingly moved to bring the contact sections 4a and 6a into contact with the fixed contacts 3 and 5. Therefore, positions where the movable contacts 4 and 6 and the fixed contacts 3 and 5 come into contact with each other can be separated from the rotation axis 9 of the lever member 2. When a rotating mechanism is included in the inside of the three-point disconnecting switch 1, from the viewpoint of, for example, a reduction in the size of a device, a configuration is often adopted in which a rotation axis is arranged in the center of the device and an insulator is arranged below the rotation axis.

In this case, if the positions where the movable contacts 4 and 6 and the fixed contacts 3 and 5 come into contact with each other are also arranged in the center in the three-point disconnecting switch 1, metal powder or the like formed by contact of the movable contacts 4 and 6 and the fixed contacts 3 and 5 drops onto the insulator and insulation performance of the three-point disconnecting switch 1 is sometimes deteriorated. On the other hand, in the first embodiment, the positions where the movable contacts 4 and 6 and the fixed contacts 3 and 5 come into contact with each other can be separated from the rotation axis 9 of the lever member 2. Therefore, metal powder or the like less easily drops onto the insulator. It is possible to suppress the deterioration in the insulation performance.

When the neutral state, the DS input state, and the ES input state are changed, the pin 11 that moves the movable contacts 4 and 6 moves in the linear grooves 12a and 14a or the arcuate grooves 12b and 14b. That is, in a process for changing a state of the movable contacts 4 and 6, the pin 11 does not come off the grooves 12 and 14 formed in the movable contacts 4 and 6. Therefore, a malfunction of the movable contacts 4 and 6 less easily occurs. It is possible to stabilize the state and the movement of the movable contacts 4 and 6.

The insulating rod 8 needs to have length equal to or larger than a predetermined length according to, for example, a request for insulation performance. Therefore, it is possible to realize a reduction in the size of a mechanism around the movable contacts 4 and 6 by arranging the movable contacts 4 and 6 dividedly on both the surface sides of the lever member 2. That is, it is possible to realize effective utilization of that region and realize a reduction in the size of the mechanism by arranging the disconnecting-side movable contact 4 on a side of the insulating rod 8 as shown in FIG. 2.

In the first embodiment, the grooves 12 and 14 having a shape opened at an end are illustrated. However, the grooves 12 and 14 are not limited to the shape. If the grooves 12 and 14 have a shape closed at the end, the pin 11 much less easily comes off the grooves 12 and 14.

Figure 10:
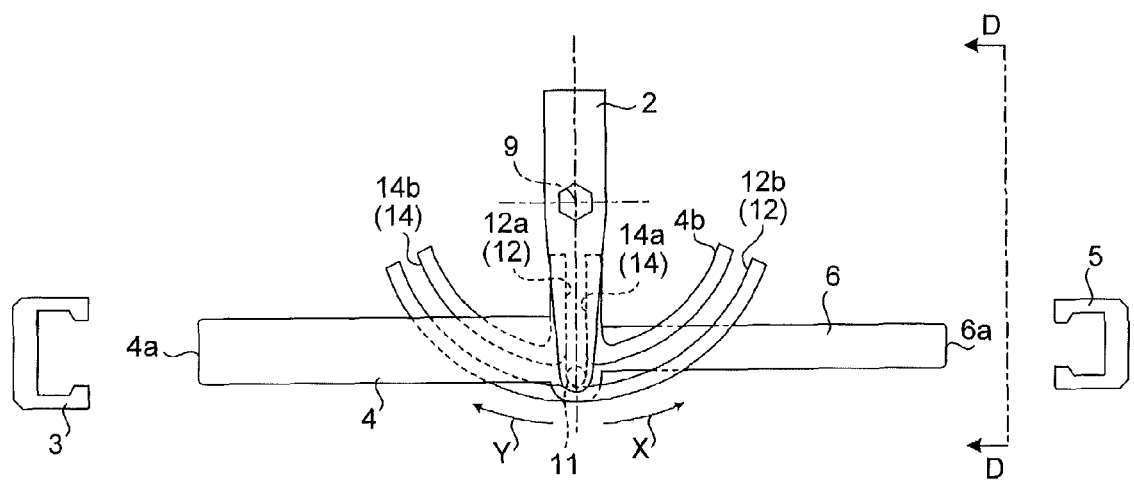
FIG. 10 is a diagram of a state in which the movable contacts and the lever member are incorporated in the container and a diagram of a state in which both of the disconnecting-side movable contact and the earth-side movable contact are separated from the fixed contacts in a three-point disconnecting switch according to a first modification of the first embodiment.
Figure 11:
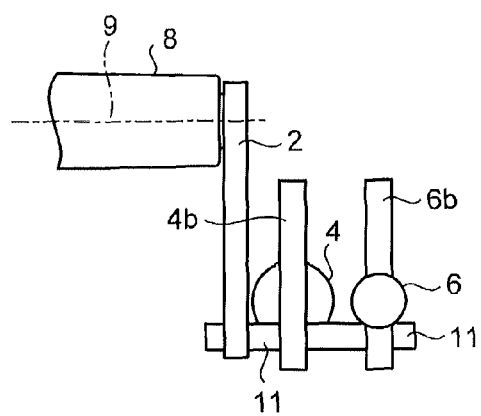
FIG. 11 is an arrow view taken along line D-D shown in FIG. 10.

FIG. 10 is a diagram of a state in which the movable contacts and the lever member are incorporated in the container and a diagram of a state in which both of the disconnecting-side movable contact and the earth-side movable contact are separated from the fixed contacts in a three-point disconnecting switch according to a first modification of the first embodiment. FIG. 11 is an arrow view taken along line D-D shown in FIG. 10.

In the first modification, both of the disconnecting-side movable contact 4 and the earth-side movable contact 6 are arranged side by side on one surface side of the lever member 2. The pin 11 formed in the lever member 2 is formed longer than the pin 11 shown in FIG. 3-2 such that the pin 11 is fit in both the grooves 12 and 14 formed in the disconnecting-side movable contact 4 and the earth-side movable contact 6.

Figure 12:
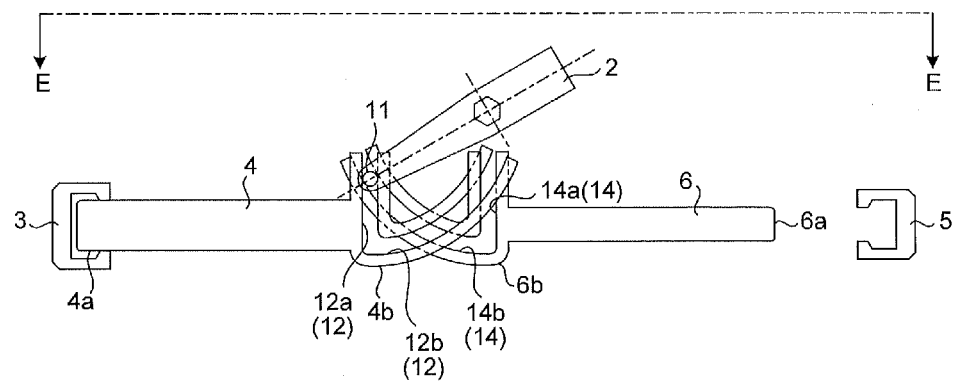
FIG. 12 is a diagram of a state in which the movable contacts and the lever member are incorporated in the container and a diagram of a state in which the disconnecting-side movable contact is in contact with the disconnecting-side fixed contact in a three-point disconnecting switch according to a second modification of the first embodiment.
Figure 13:
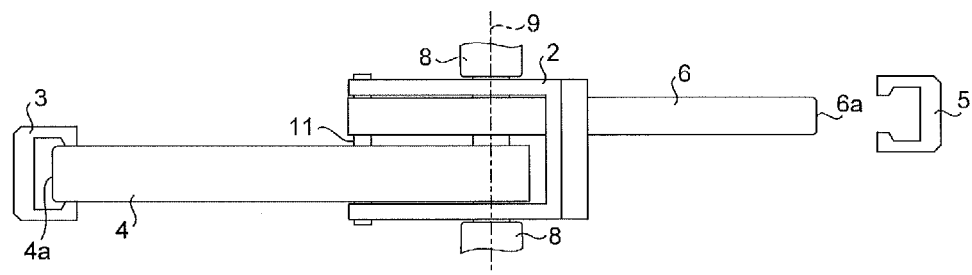
FIG. 13 is an arrow view taken along line E-E shown in FIG. 12.

FIG. 12 is a diagram of a state in which the movable contacts and the lever member are incorporated in the container and a diagram of a state in which the disconnecting-side movable contact is in contact with the disconnecting-side fixed contact in a three-point disconnecting switch according to a second modification of the first embodiment. FIG. 13 is an arrow view taken along line E-E shown in FIG. 12.

In the second modification, as shown in FIG. 13, the lever member 2 assumes a C shape in section. The lever member 2 holds the pin 11 from both the side of the pin 11. Because the pin 11 is held by the lever member 2 from both sides of the pin 11 in this way, it is possible to suppress backlash of the pin 11 when the movable contacts 4 and 6 move and it is possible to realize stabilization of the operation of the three-point disconnecting switch 1. Because the pin 11 is held by the lever member 2 from both sides of the pin 11, the pin 11 is less easily deformed. Therefore, it is possible to realize improvement of the durability of the three-point disconnecting switch 1 and realize stabilization of the operation of the three-point disconnecting switch 1.

Because the lever member 2 is formed in the C shape in section, it is possible to realize improvement of the strength of the lever member 2 itself. Consequently, it is possible to realize improvement of the durability of the three-point disconnecting switch 1 and cause the three-point disconnecting switch 1 to stably operate.

Second Embodiment

Figure 14:
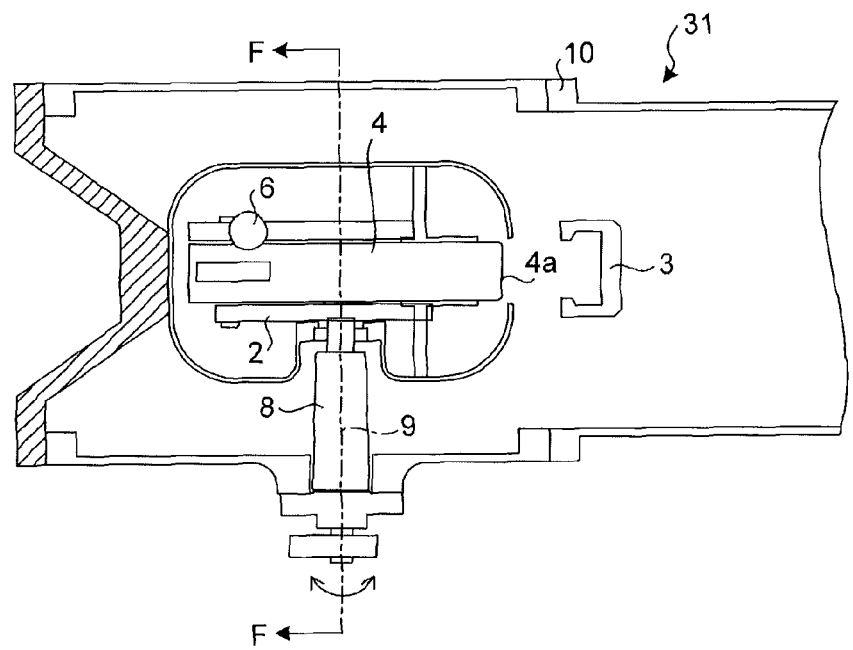
FIG. 14 is a plan sectional view of a schematic configuration of a three-point disconnecting switch according to a second embodiment of the present invention.
Figure 15:
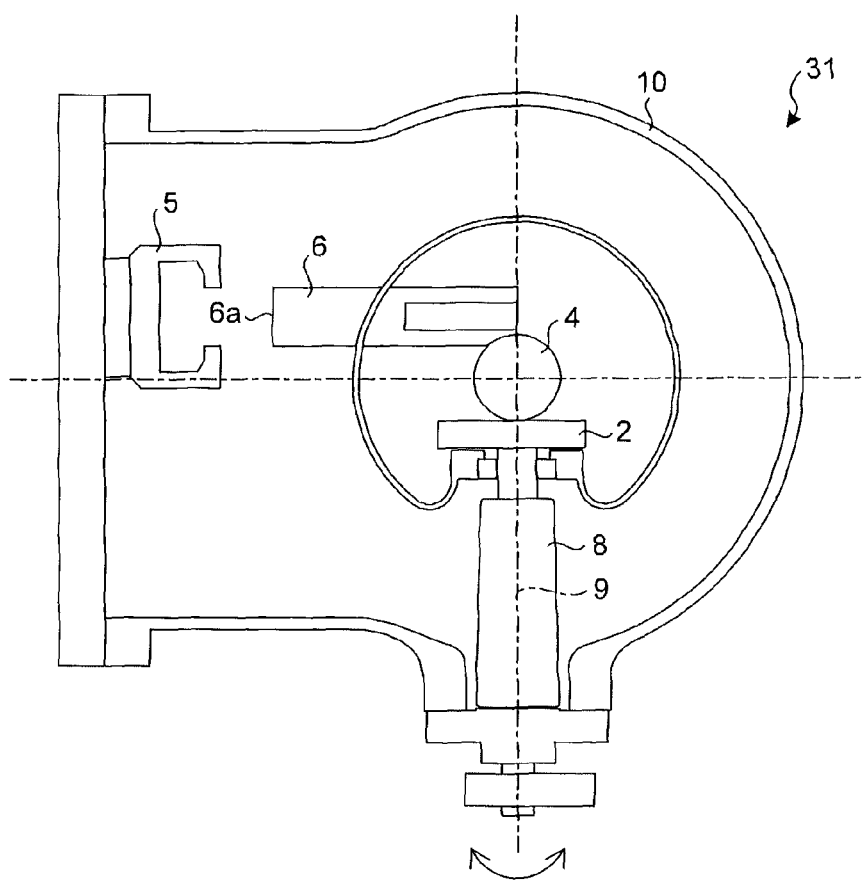
FIG. 15 is an arrow sectional view taken along line F-F shown in FIG. 14.
Figure 16:
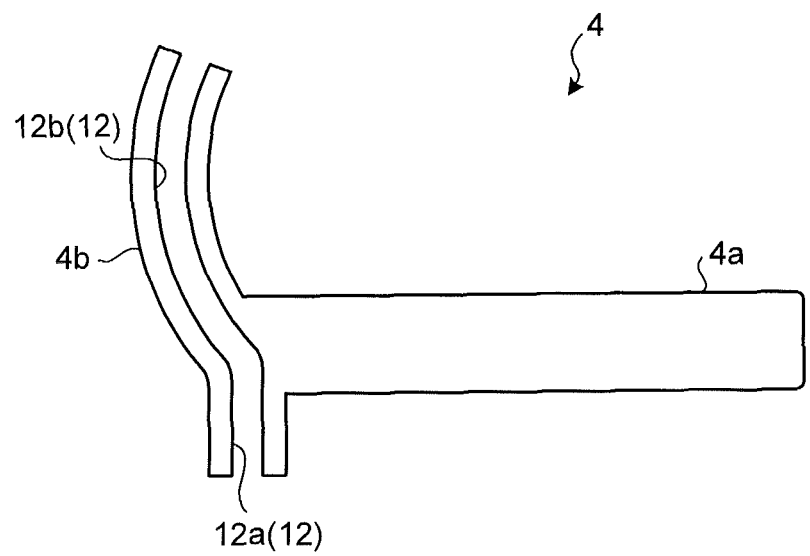
FIG. 16 is a diagram of a schematic configuration of a disconnecting-side movable contact included in the three-point disconnecting switch shown in FIG. 14.
Figure 17:
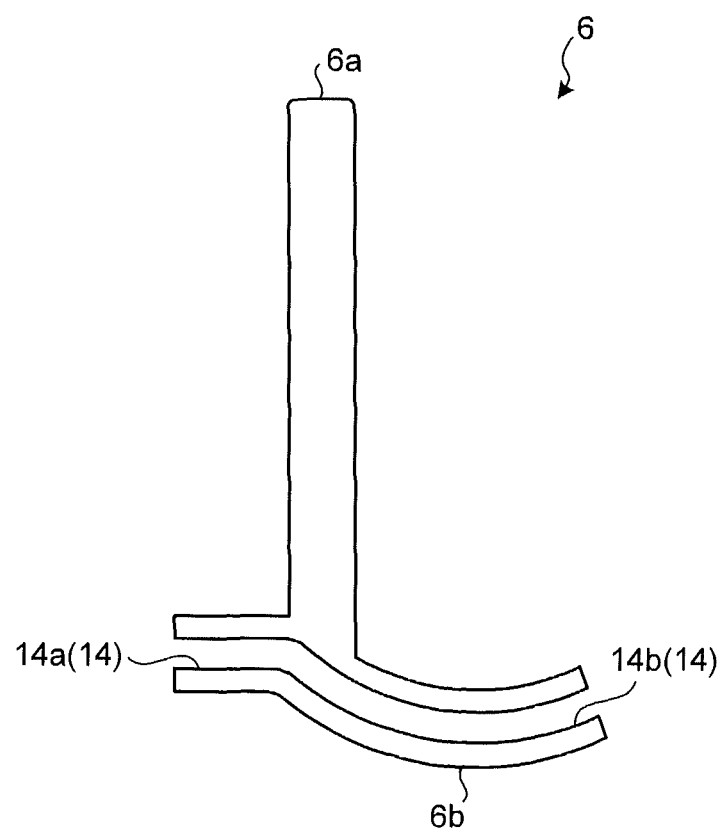
FIG. 17 is a diagram of a schematic configuration of an earth-side movable contact included in the three-point disconnecting switch shown in FIG. 14.
Figure 18:
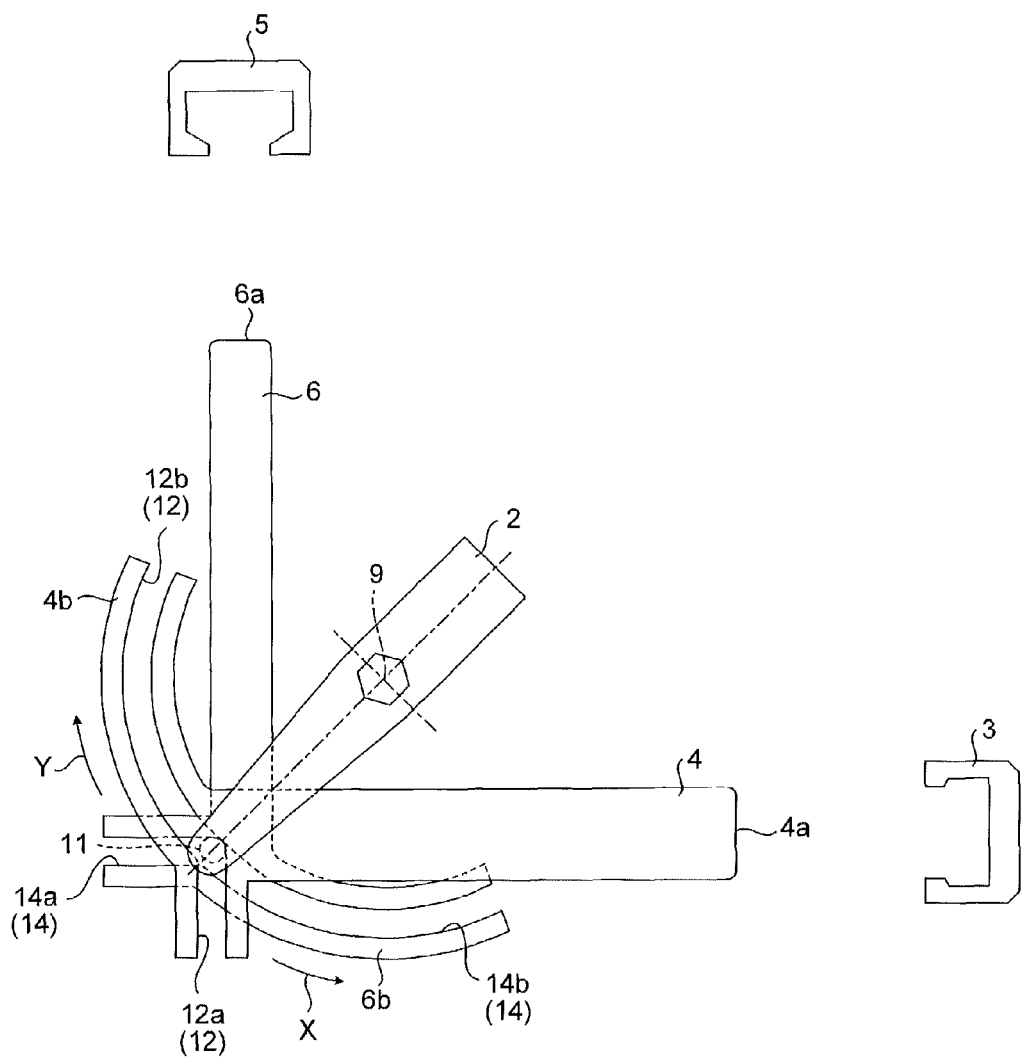
FIG. 18 is a diagram of a state in which the movable contacts and a lever member are incorporated in a container and a diagram of a state in which both of the disconnecting-side movable contact and the earth-side movable contact are separated from fixed contacts.
Figure 19:
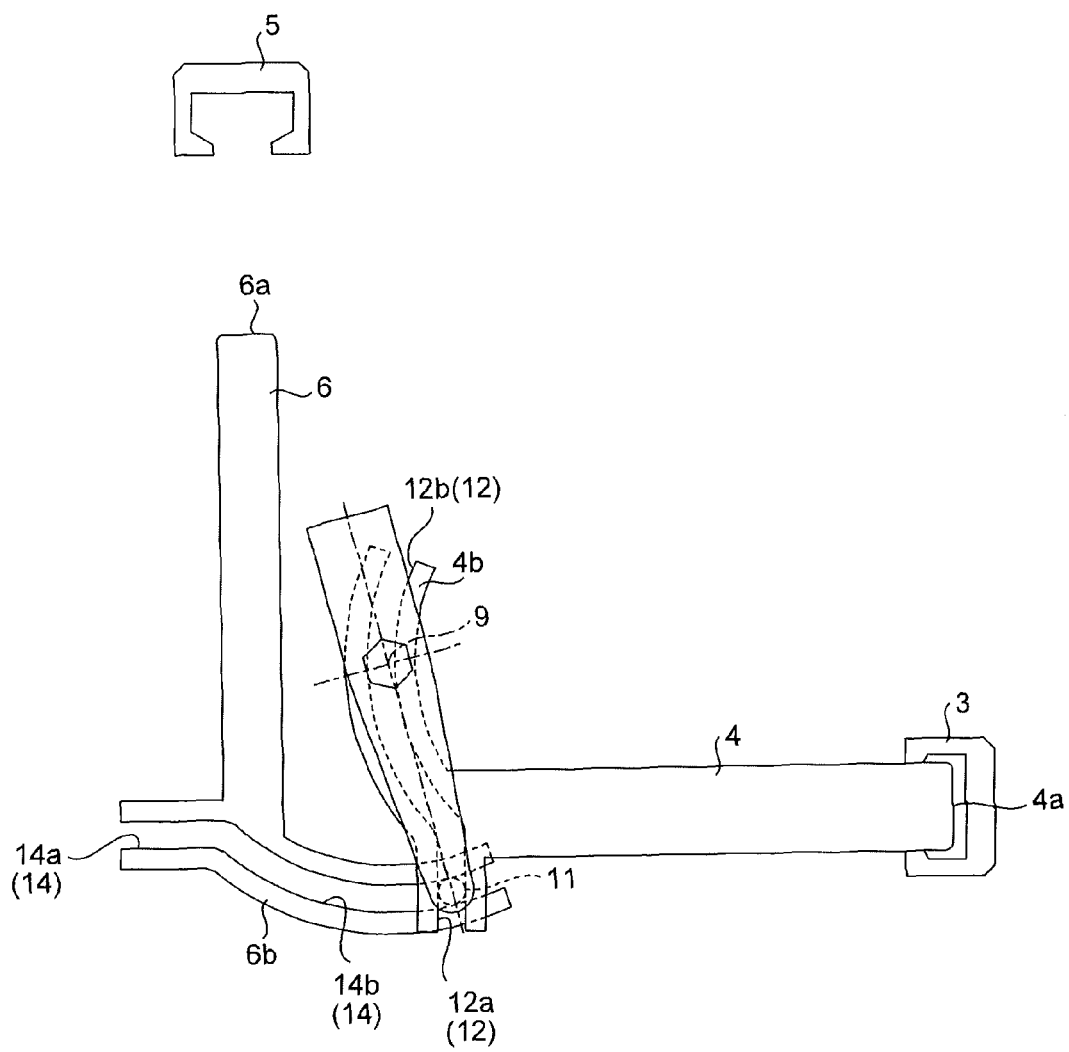
FIG. 19 is a diagram of a state in which the movable contacts and the lever member are incorporated in the container and a diagram of a state in which the disconnecting-side movable contact is in contact with a disconnecting-side fixed contact.
Figure 20:
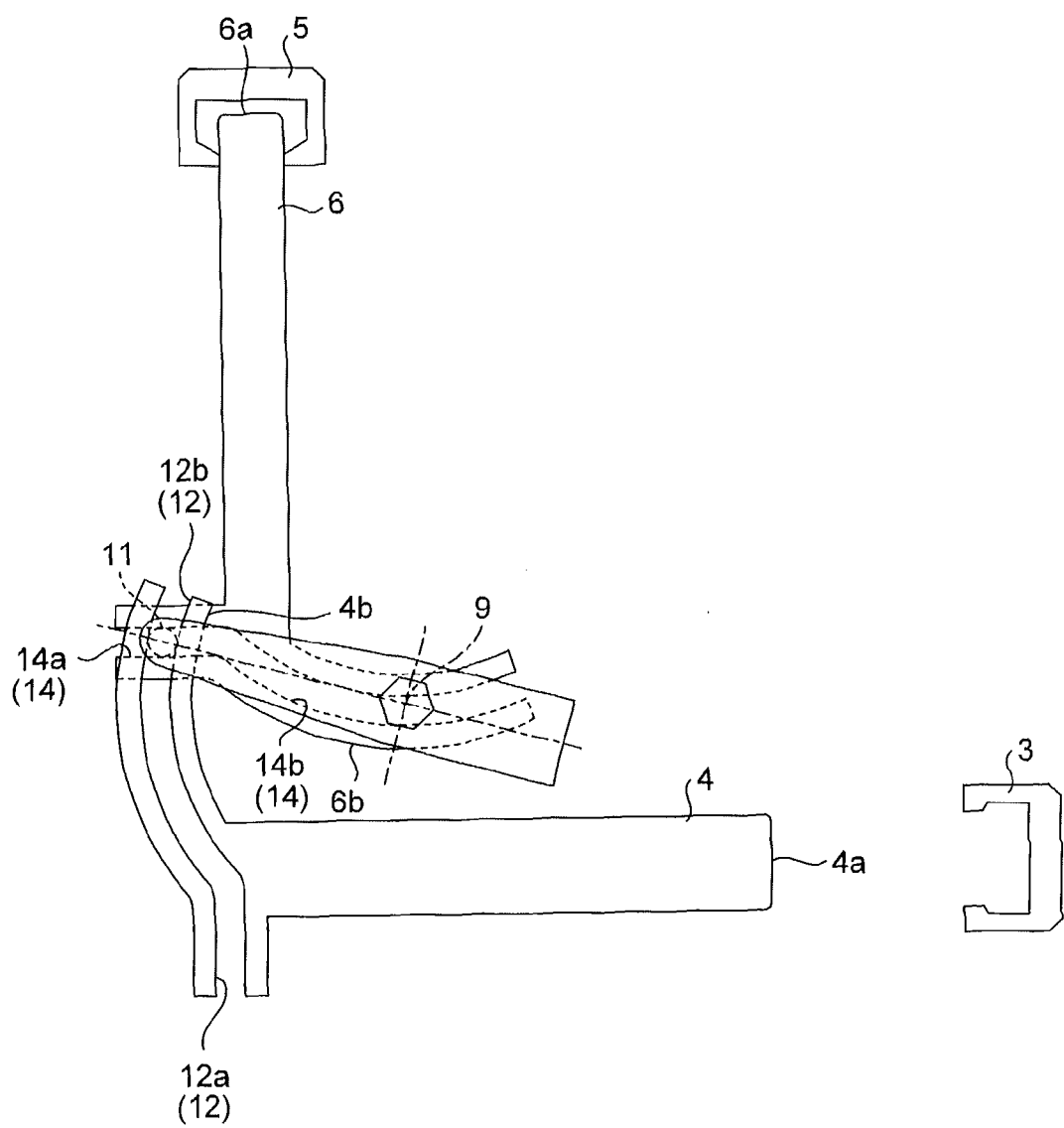
FIG. 20 is a diagram of a state in which the movable contacts and the lever member are incorporated in the container and a diagram of a state in which the earth-side movable contact is in contact with an earth-side fixed contact.

FIG. 14 is a plan sectional view of a schematic configuration of a three-point disconnecting switch according to a second embodiment of the present invention. FIG. 15 is an arrow sectional view taken along line F-F shown in FIG. 14. FIG. 16 is a diagram of a schematic configuration of a disconnecting-side movable contact included in the three-point disconnecting switch shown in FIG. 14. FIG. 17 is a diagram of a schematic configuration of an earth-side movable contact included in the three-point disconnecting switch shown in FIG. 14. FIG. 18 is a diagram of a state in which the movable contacts and a lever member are incorporated in a container and a diagram of a state in which both of the disconnecting-side movable contact and the earth-side movable contact are separated from fixed contacts. FIG. 19 is a diagram of a state in which the movable contacts and the lever member are incorporated in the container and a diagram of a state in which the disconnecting-side movable contact is in contact with a disconnecting-side fixed contact. FIG. 20 is a diagram of a state in which the movable contacts and the lever member are incorporated in the container and a diagram of a state in which the earth-side movable contact is in contact with an earth-side fixed contact. In the following explanation, components same as the components in the embodiment explained above are denoted by the same reference numerals and signs and detailed explanation of the components is omitted.

In the second embodiment, as shown in FIGS. 18 to 20, a moving direction of the disconnecting-side movable contact 4 in coming into contact with the disconnecting-side fixed contact 3 and a moving direction of the earth-side movable contact 6 in coming into contact with the earth-side fixed contact 5 are different from each other about 90 degrees.

The guide section 4b included in the disconnecting-side movable contact 4 and the guide section 6b included in the earth-side movable contact 6, i.e., the grooves 12 and 14 are formed in a shape different from the shape explained in the first embodiment. More specifically, the linear grooves 12a and 14a are formed in regions on the outer side of arcs drawn by the arcuate grooves 12b and 14b.

Because the shape of the grooves 12 and 14 formed in the movable contacts 4 and 6 is changed in this way, it is possible to set moving directions of the movable contacts 4 and 6 different from the moving directions explained in the first embodiment. Therefore, it is possible to realize improvement of design freedom of the internal configuration and the like of a three-point disconnecting switch 31.

In the second embodiment, it is possible to obtain an effect same as the effect in the first embodiment. That is, it is possible to select the DS input state and the ES input state as appropriate after selecting the neutral state by operating the insulating rod 8 to rotate the lever member 2. When the DS input state and the ES input state are changed, while one of the movable contacts 4 and 6 is moved by the pin 11 that passes the linear groove 12a or 14a, the pin 11 passes the arcuate groove 12b or 14b of the other movable contact 4 or 6 while hardly interfering with the sidewall of the arcuate groove 12b or 14b. Therefore, the disconnecting-side movable contact 4 and the earth-side movable contact 6 alternately move. It is possible to prevent, without providing a special device or mechanism, both of the disconnecting-side movable contact 4 and the earth-side movable contact 6 from simultaneously coming into contact with the fixed contacts 3 and 5.

It is possible to move the two movable contacts 4 and 6 by rotating the one lever member 2. Therefore, it is possible to realize a reduction in the number of components compared with the number of components including actuating mechanisms respectively provided in the movable contacts 4 and 6. According to the reduction in the number of components, it is possible to realize a reduction in the size of the three-point disconnecting switch 31. In changing the neutral state, the DS input state, and the ES input state, a user of the three-point disconnecting switch 31 only has to operate the one insulating rod 8. Therefore, it is possible to realize improvement of convenience of use of the three-point disconnecting switch 31.

The movable contacts 4 and 6 are reciprocatingly moved to bring the contact sections 4a and 6a into contact with the fixed contacts 3 and 5. Therefore, positions where the movable contacts 4 and 6 and the fixed contacts 3 and 5 come into contact with each other can be separated from the rotation axis 9 of the lever member 2. When a rotating mechanism is included in the inside of the three-point disconnecting switch 31, from the viewpoint of, for example, a reduction in the size of a device, a configuration is often adopted in which a rotation axis is arranged in the center of the device and an insulator is arranged below the rotation axis.

In this case, if the positions where the movable contacts 4 and 6 and the fixed contacts 3 and 5 come into contact with each other are also arranged in the center in the three-point disconnecting switch 31, metal powder or the like formed by contact of the movable contacts 4 and 6 and the fixed contacts 3 and 5 drops onto the insulator and insulation performance of the three-point disconnecting switch 1 is sometimes deteriorated. On the other hand, in the second embodiment, the positions where the movable contacts 4 and 6 and the fixed contacts 3 and 5 come into contact with each other can be separated from the rotation axis 9 of the lever member 2. Therefore, metal powder or the like less easily drops onto the insulator. It is possible to suppress the deterioration in the insulation performance.

When the neutral state, the DS input state, and the ES input state are changed, the pin 11 that moves the movable contacts 4 and 6 moves in the linear grooves 12a and 14a or the arcuate grooves 12b and 14b. That is, in a process for changing a state of the movable contacts 4 and 6, the pin 11 does not come off the grooves 12 and 14 formed in the movable contacts 4 and 6. Therefore, a malfunction of the movable contacts 4 and 6 less easily occurs. It is possible to stabilize the state and the movement of the movable contacts 4 and 6.

Figure 21:
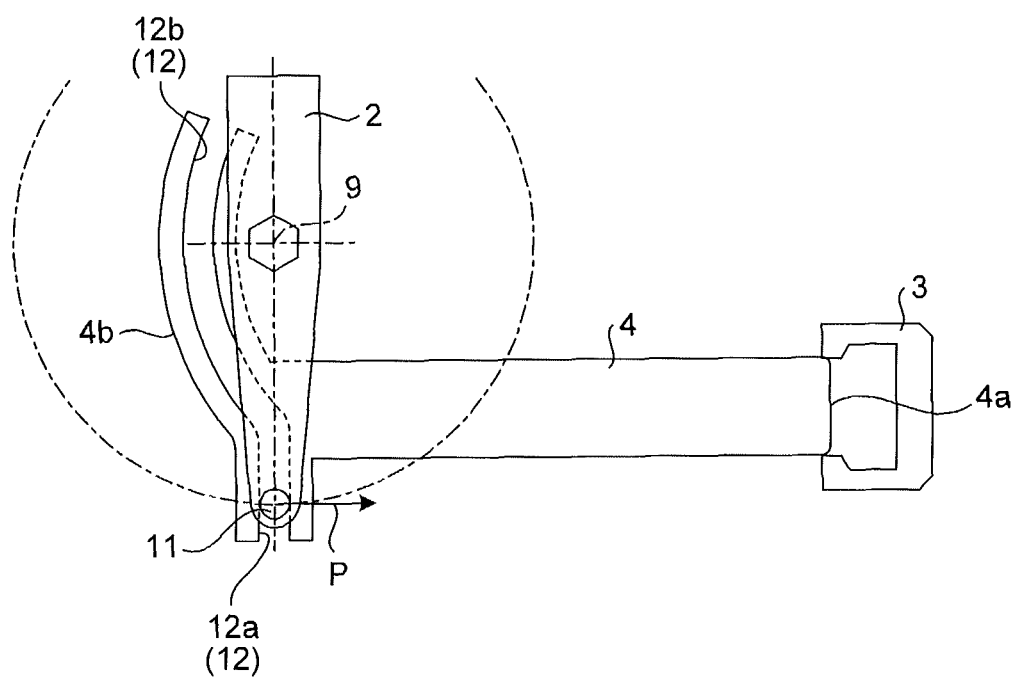
FIG. 21 is a diagram for explaining a positional relation between the disconnecting-side movable contact and the disconnecting-side fixed contact.

FIG. 21 is a diagram for explaining a positional relation between the disconnecting-side movable contact 4 and the disconnecting-side fixed contact 3. As shown in FIG. 21, the disconnecting-side movable contact 4 and the disconnecting-side fixed contact 3 are arranged in a positional relation in which the contact section 4a of the disconnecting-side movable contact 4 comes into contact with the disconnecting-side fixed contact 3 when a tangential direction (a direction indicated by an arrow P) of a moving track of the pin 11 moving in the linear groove 12a of the disconnecting-side movable contact 4 substantially coincides with the moving direction of the disconnecting-side movable contact 4.

To more surely bring the contact section 4a of the disconnecting-side movable contact 4 and the disconnecting-side fixed contact 3 into contact with each other, the contact section 4a of the disconnecting-side movable contact 4 is configured to be held by the disconnecting-side fixed contact 3. When the contact section 4a is not in contact with the disconnecting-side fixed contact 3, a width between points of contact of the contact section 4a and the disconnecting-side fixed contact 3 is smaller than the thickness of the contact section 4a.

When the contact section 4a is inserted into a gap between the points of contact of the disconnecting-side fixed contact 3, i.e., when the contact section 4a comes into contact with the disconnecting-side fixed contact 3, it is necessary to apply a large driving force to the disconnecting-side movable contact 4. If the pin 11 is driven by a predetermined driving force, the pin 11 can apply a largest driving force to the disconnecting-side fixed contact 3 when a moving direction of the pin 11, i.e., a tangential direction of a moving track of the pin 11 and a moving direction of the disconnecting-side movable contact 4 coincide with each other.

In the second embodiment, as explained above, the disconnecting-side movable contact 4 and the disconnecting-side fixed contact 3 are arranged in a positional relation in which the contact section 4a of the disconnecting-side movable contact 4 comes into contact with the disconnecting-side fixed contact 3 when the tangential direction (the direction indicated by the arrow P) of the moving track of the pin 11 substantially coincides with the moving direction of the disconnecting-side movable contact 4. Therefore, the three-point disconnecting switch 31 can be configured such that a largest driving force is requested at a point when the driving force applied by the pin 11 (the lever member 2) is shown most efficiently. Therefore, it is possible to reduce a driving force, which needs to be applied to the pin 11 (the lever member 2), as much as possible and improve the operability of the three-point disconnecting switch 31.

The same applies to the earth-side movable contact 6 and the earth-side fixed contact 5. Therefore, a positional relation between the earth-side movable contact 6 and the earth-side fixed contact 5 can be configured the same as the positional relation explained above.

As explained in the first embodiment, the movable contacts 4 and 6 can be dividedly arranged on both the surface sides of the lever member 2 or can be arranged side by side on the one surface side of the lever member 2. Further, the grooves 12 and 14 can be formed in a shape closed at an end to more surely suppress the pin 11 from coming off the grooves 12 and 14.

Figure 22:
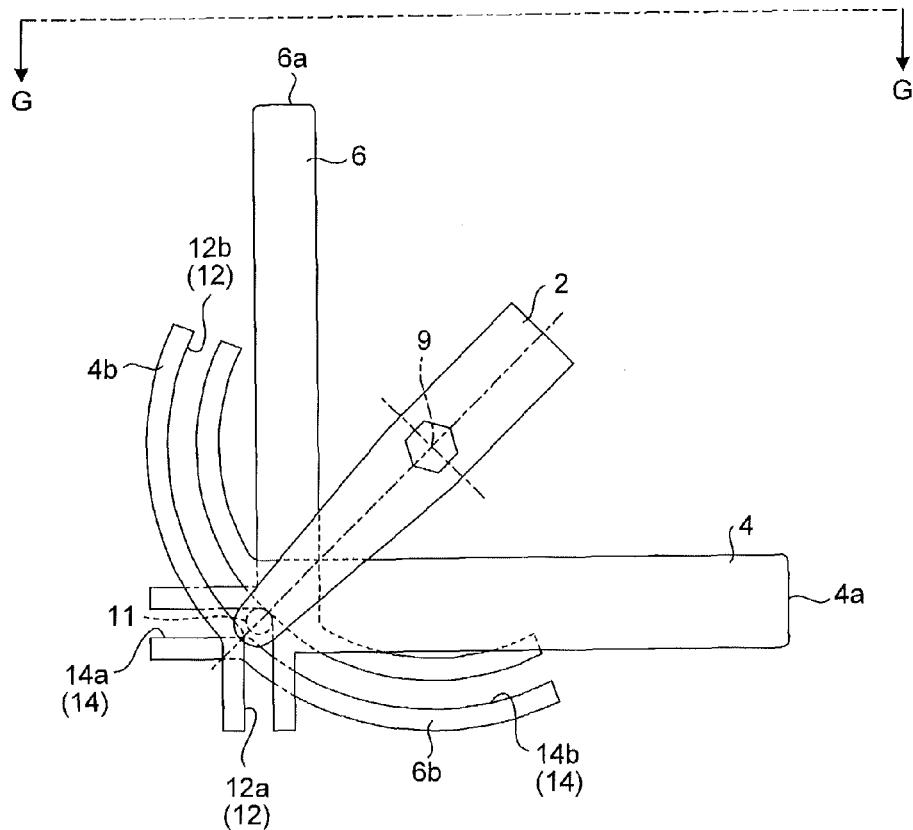
FIG. 22 is a diagram of a state in which the movable contacts and the lever member are incorporated in the container and a diagram of a state in which both of the disconnecting-side movable contact and the earth-side movable contact are separated from the fixed contacts and a state in which both of the disconnecting-side movable contact and the earth-side movable contact are separated from the fixed contacts in a three-point disconnecting switch according to a first modification of the second embodiment.
Figure 23:
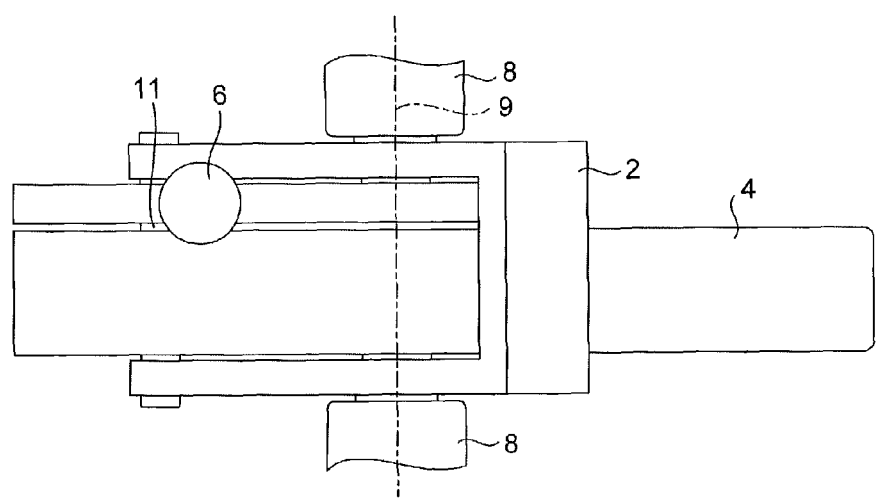
FIG. 23 is an arrow view taken along line G-G shown in FIG. 22.

FIG. 22 is a diagram of a state in which the movable contacts and the lever member are incorporated in the container and a diagram of a state in which both of the disconnecting-side movable contact and the earth-side movable contact are separated from the fixed contacts in a three-point disconnecting switch according to a first modification of the second embodiment. FIG. 23 is an arrow view taken along line G-G shown in FIG. 22.

In the first modification, as in the second modification of the first embodiment, the lever member 2 assumes a C shape in section and holds the pin 11 from both sides of the pin 11. Because the pin 11 is held by the lever member 2 from both sides of the pin 11 in this way, it is possible to suppress backlash of the pin 11 when the movable contacts 4 and 6 move and it is possible to realize stabilization of the operation of the three-point disconnecting switch 31. Because the pin 11 is held by the lever member 2 from both sides of the pin 11, the pin 11 is less easily deformed. Therefore, it is possible to realize improvement of the durability of the three-point disconnecting switch 31 and realize stabilization of the operation of the three-point disconnecting switch 31.

Because the lever member 2 is formed in the C shape in section, it is possible to realize improvement of the strength of the lever member 2 itself. Consequently, it is possible to realize improvement of the durability of the three-point disconnecting switch 31 and cause the three-point disconnecting switch 31 to stably operate.

Third Embodiment

Figure 24:
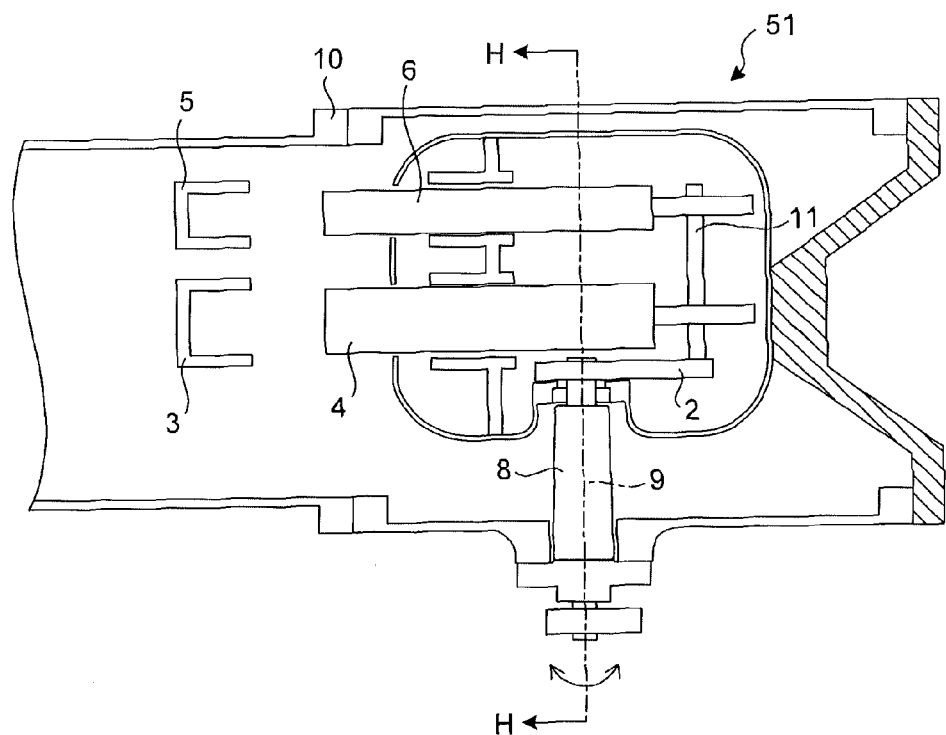
FIG. 24 is a plan sectional view of a schematic configuration of a three-point disconnecting switch according to a third embodiment of the present invention.
Figure 25:
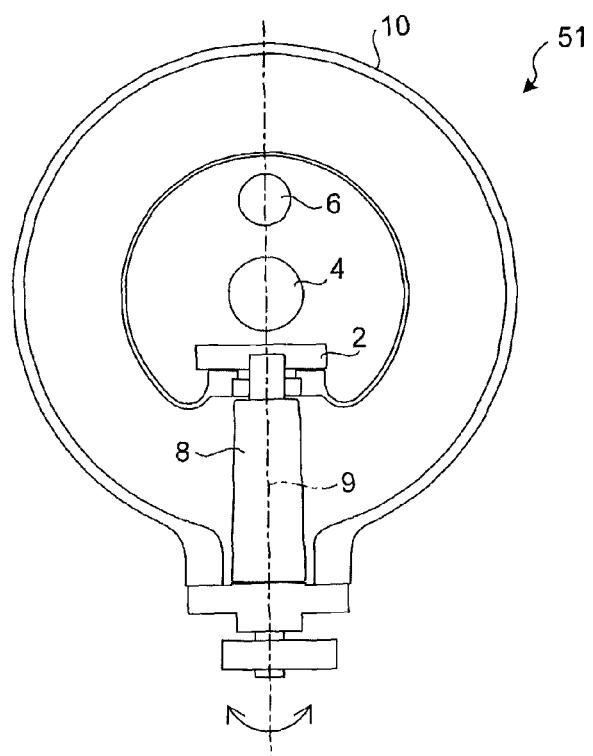
FIG. 25 is an arrow sectional view taken along line H-H shown in FIG. 24.
Figure 26:
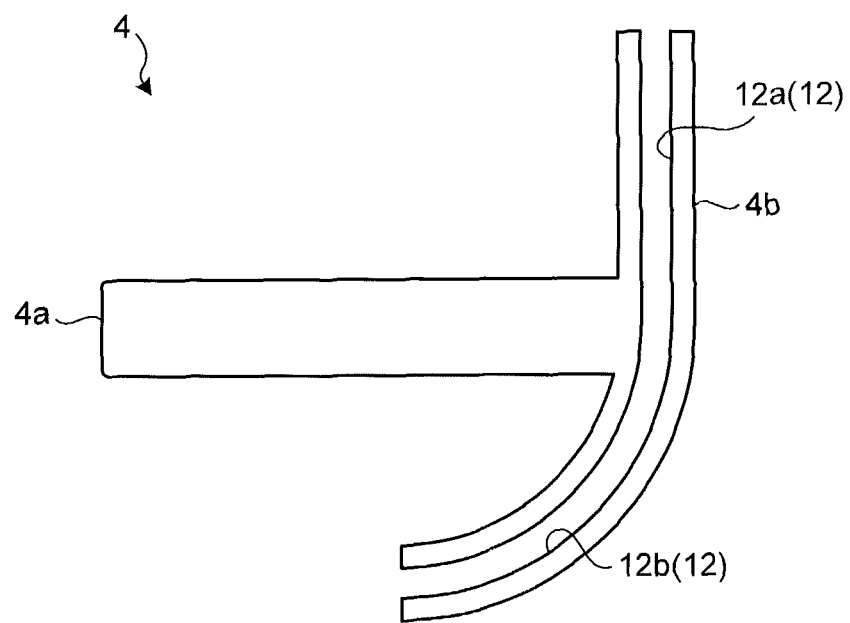
FIG. 26 is a diagram of a schematic configuration of a disconnecting-side movable contact included in the three-point disconnecting switch shown in FIG. 24.
Figure 27:
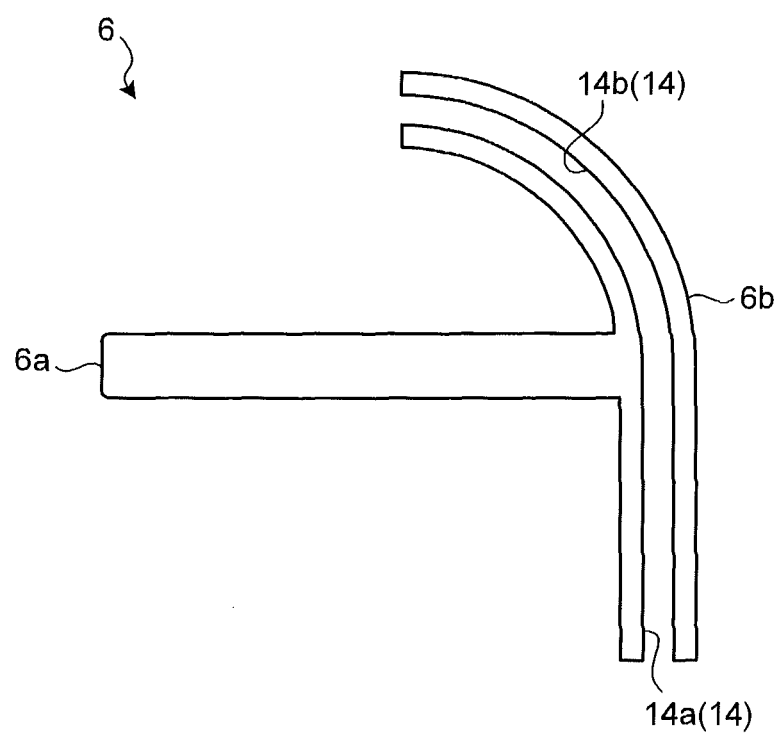
FIG. 27 is a diagram of a schematic configuration of an earth-side movable contact included in the three-point disconnecting switch shown in FIG. 24.
Figure 28:
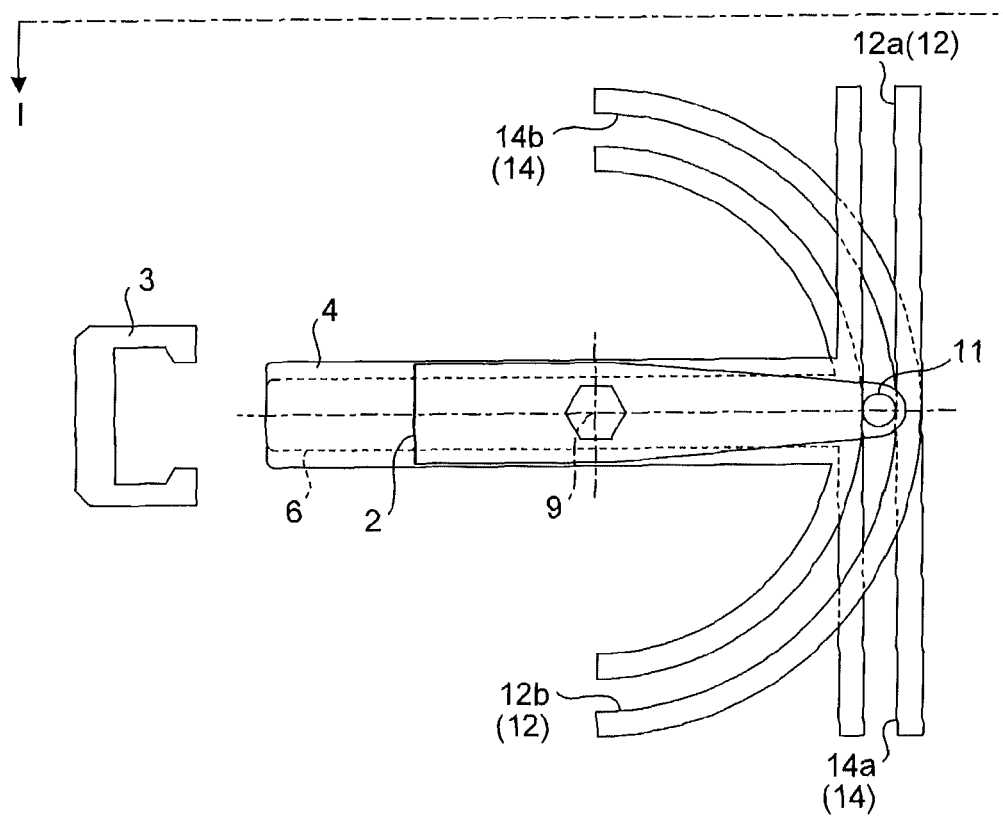
FIG. 28 is a diagram of a state in which the movable contacts and a lever member are incorporated in a container and a diagram of a state in which both of the disconnecting-side movable contact and the earth-side movable contact are separated from fixed contacts.
Figure 29:
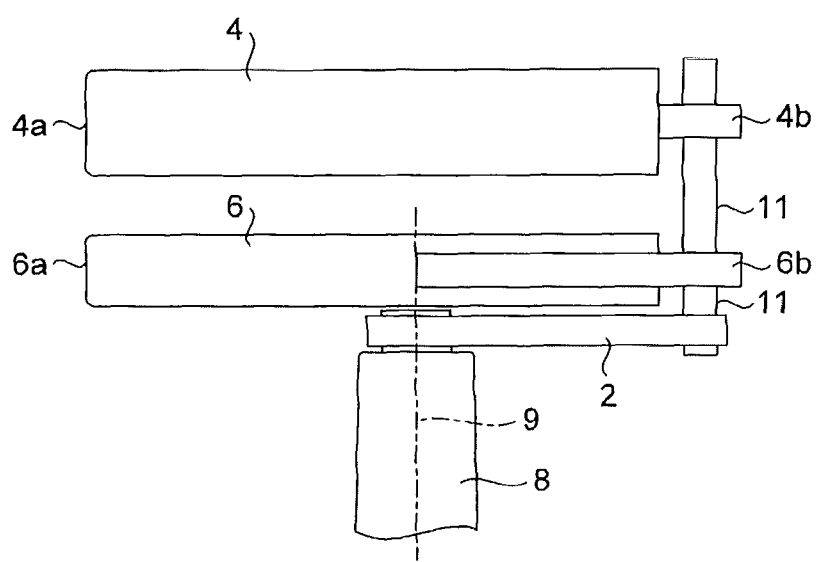
FIG. 29 is an arrow view taken along line I-I shown in FIG. 28.
Figure 30:
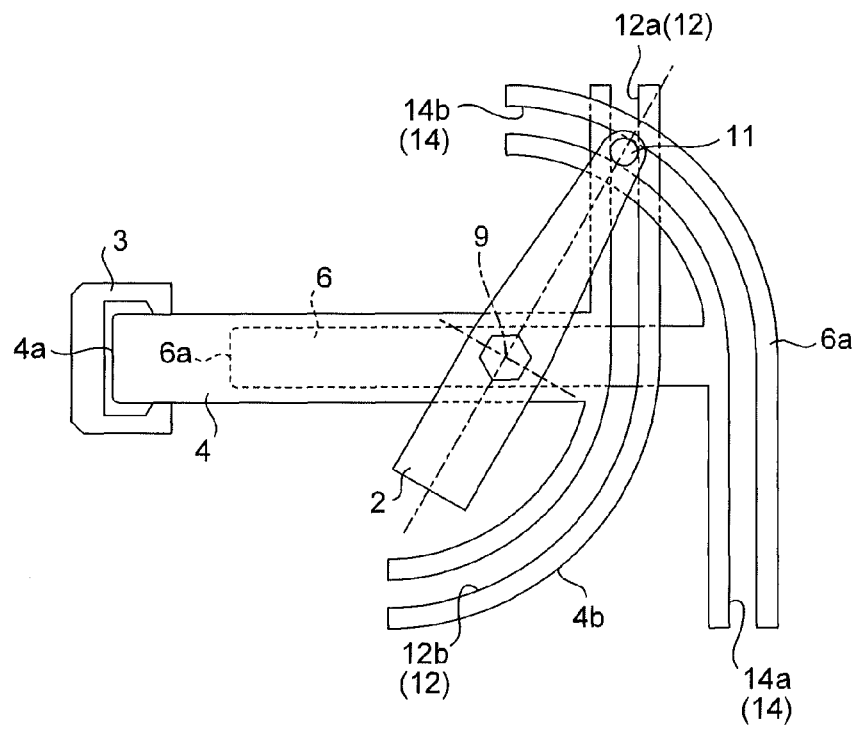
FIG. 30 is a diagram of a state in which the movable contacts and the lever member are incorporated in the container and a diagram of a state in which the disconnecting-side movable contact is in contact with a disconnecting-side fixed contact.
Figure 31:
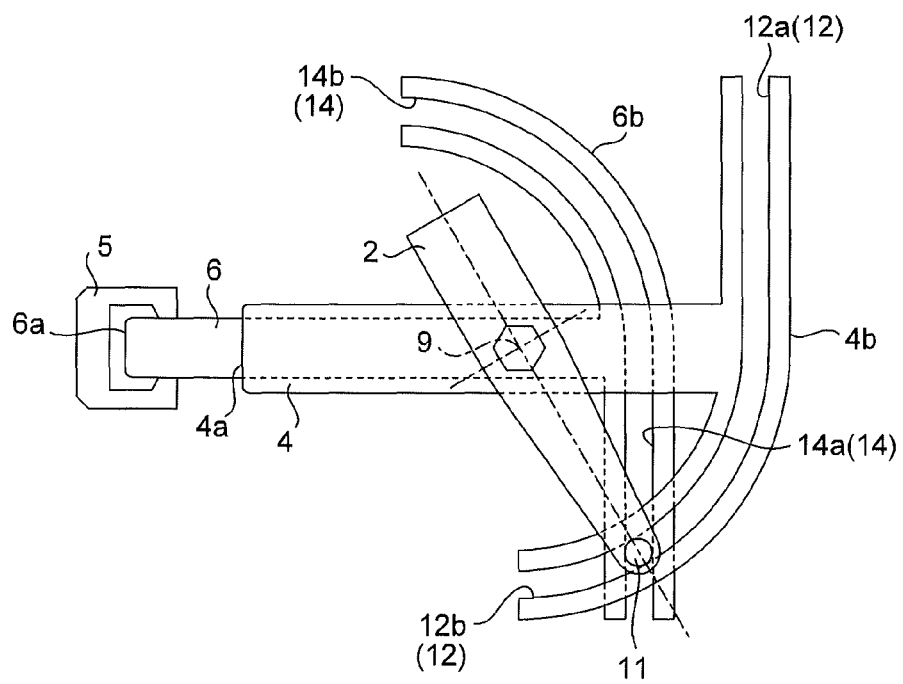
FIG. 31 is a diagram of a state in which the movable contacts and the lever member are incorporated in the container and a diagram of a state in which the earth-side movable contact is in contact with an earth-side fixed contact.

FIG. 24 is a plan sectional view of a schematic configuration of a three-point disconnecting switch according to a third embodiment of the present invention. FIG. 25 is an arrow sectional view taken along line H-H shown in FIG. 24. FIG. 26 is a diagram of a schematic configuration of a disconnecting-side movable contact included in the three-point disconnecting switch shown in FIG. 24. FIG. 27 is a diagram of a schematic configuration of an earth-side movable contact included in the three-point disconnecting switch shown in FIG. 24. FIG. 28 is a diagram of a state in which the movable contacts and a lever member are incorporated in a container and a diagram of a state in which both of the disconnecting-side movable contact and the earth-side movable contact are separated from fixed contacts. FIG. 29 is an arrow view taken along line I-I shown in FIG. 28. FIG. 30 is a diagram of a state in which the movable contacts and the lever member are incorporated in the container and a diagram of a state in which the disconnecting-side movable contact is in contact with a disconnecting-side fixed contact. FIG. 31 is a diagram of a state in which the movable contacts and the lever member are incorporated in the container and a diagram of a state in which the earth-side movable contact is in contact with an earth-side fixed contact. In the following explanation, components same as the components in the embodiments explained above are denoted by the same reference numerals and signs and detailed explanation of the components is omitted.

In the third embodiment, as shown in FIGS. 28 to 31, a moving direction of the disconnecting-side movable contact 4 in coming into contact with the disconnecting-side fixed contact 3 and a moving direction of the earth-side movable contact 6 in coming into contact with the earth-side fixed contact 5 are substantially the same directions.

The guide section 4b included in the disconnecting-side movable contact 4 and the guide section 6b included in the earth-side movable contact 6, i.e., the grooves 12 and 14 are formed in a shape different from the shape explained in the first embodiment. More specifically, the linear grooves 12a and 14a are formed in regions on the outer side of arcs drawn by the arcuate grooves 12b and 14b. The arcuate grooves 12b and 14b extend from the ends of the movable contacts 4 and 6, where the guide sections 4b and 6b are formed, in a direction in which the movable contacts 4 and 6 move when coming into contact with the fixed contacts 3 and 5.

Because the shape of the grooves 12 and 14 formed in the movable contacts 4 and 6 is changed in this way, it is possible to set moving directions of the movable contacts 4 and 6 different from the moving directions explained in the first embodiment. Therefore, it is possible to realize improvement of design freedom of the internal configuration and the like of a three-point disconnecting switch 51.

In the third embodiment, it is possible to obtain an effect same as the effect in the first embodiment. That is, it is possible to select the DS input state and the ES input state as appropriate after selecting the neutral state by operating the insulating rod 8 to rotate the lever member 2. When the DS input state and the ES input state are changed, while one of the movable contacts 4 and 6 is moved by the pin 11 that passes the linear groove 12a or 14a, the pin 11 passes the arcuate groove 12b or 14b of the other movable contact 4 or 6 while hardly interfering with the sidewall of the arcuate groove 12b or 14b. Therefore, the disconnecting-side movable contact 4 and the earth-side movable contact 6 alternately move. It is possible to prevent, without providing a special device or mechanism, both of the disconnecting-side movable contact 4 and the earth-side movable contact 6 from simultaneously coming into contact with the fixed contacts 3 and 5.

It is possible to move the two movable contacts 4 and 6 by rotating the one lever member 2. Therefore, it is possible to realize a reduction in the number of components compared with the number of components including actuating mechanisms respectively provided in the movable contacts 4 and 6. According to the reduction in the number of components, it is possible to realize a reduction in the size of the three-point disconnecting switch 31.

Further, in the third embodiment, because the moving directions of the disconnecting-side movable contact 4 and the earth-side movable contact 6 are the same, it is possible to compactly arrange the disconnecting-side movable contact 4, the earth-side movable contact 6, the disconnecting-side fixed contact 3, and the earth-side fixed contact 5 and realize a further reduction in the size of the three-point disconnecting switch 51.

In changing the neutral state, the DS input state, and the ES input state, a user of the three-point disconnecting switch 51 only has to operate the one insulating rod 8. Therefore, it is possible to realize improvement of convenience of use of the three-point disconnecting switch 51.

The movable contacts 4 and 6 are reciprocatingly moved to bring the contact sections 4a and 6a into contact with the fixed contacts 3 and 5. Therefore, positions where the movable contacts 4 and 6 and the fixed contacts 3 and 5 come into contact with each other can be separated from the rotation axis 9 of the lever member 2. When a rotating mechanism is included in the inside of the three-point disconnecting switch 51, from the viewpoint of, for example, a reduction in the size of a device, a configuration is often adopted in which a rotation axis is arranged in the center of the device and an insulator is arranged below the rotation axis.

In this case, if the positions where the movable contacts 4 and 6 and the fixed contacts 3 and 5 come into contact with each other are also arranged in the center in the three-point disconnecting switch 51, metal powder or the like formed by contact of the movable contacts 4 and 6 and the fixed contacts 3 and 5 drops onto the insulator and insulation performance of the three-point disconnecting switch 51 is sometimes deteriorated. On the other hand, in the third embodiment, the positions where the movable contacts 4 and 6 and the fixed contacts 3 and 5 come into contact with each other can be separated from the rotation axis 9 of the lever member 2. Therefore, metal powder or the like less easily drops onto the insulator. It is possible to suppress the deterioration in the insulation performance.

When the neutral state, the DS input state, and the ES input state are changed, the pin 11 that moves the movable contacts 4 and 6 moves in the linear grooves 12a and 14a or the arcuate grooves 12b and 14b. That is, in a process for changing a state of the movable contacts 4 and 6, the pin 11 does not come off the grooves 12 and 14 formed in the movable contacts 4 and 6. Therefore, a malfunction of the movable contacts 4 and 6 less easily occurs. It is possible to stabilize the state and the movement of the movable contacts 4 and 6.

As explained in the first embodiment, the movable contacts 4 and 6 can be dividedly arranged on both the surface sides of the lever member 2 or can be arranged side by side on the one surface side of the lever member 2. The grooves 12 and 14 can be formed in a shape closed at an end to more surely suppress the pin 11 from coming off the grooves 12 and 14.

Figure 32:
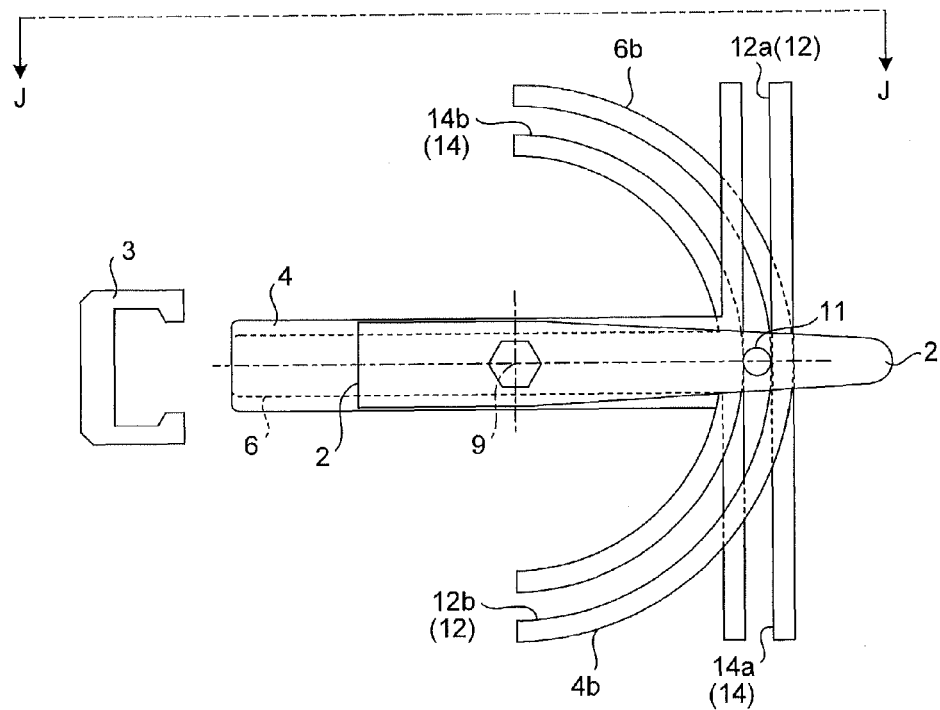
FIG. 32 is a diagram of a state in which the movable contacts and the lever member are incorporated in the container and a diagram of a state in which both of the disconnecting-side movable contact and the earth-side movable contact are separated from the fixed contacts.
Figure 33:
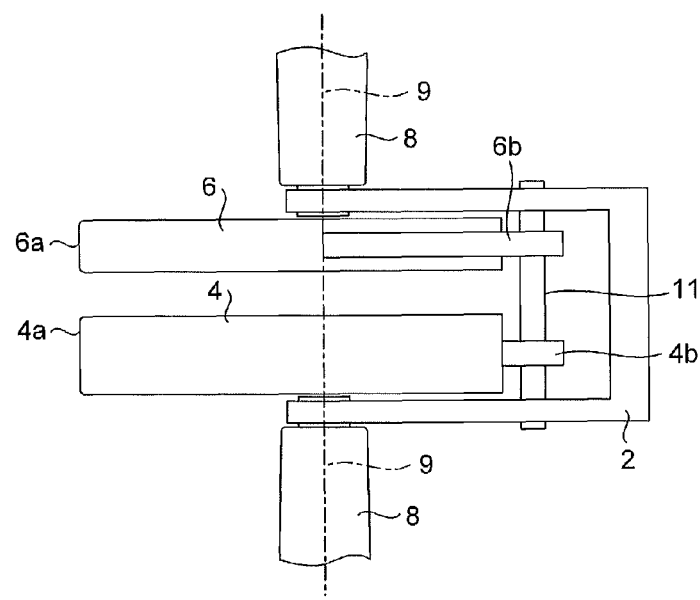
FIG. 33 is an arrow view taken along line J-J shown in FIG. 32.

FIG. 32 is a diagram of a state in which the movable contacts and the lever member are incorporated in the container and a diagram of a state in which both of the disconnecting-side movable contact and the earth-side movable contact are separated from the fixed contacts in a three-point disconnecting switch according to a first modification of the third embodiment. FIG. 33 is an arrow view taken along line J-J shown in FIG. 32.

In the first modification, as in the second modification of the first embodiment, the lever member 2 assumes a C shape in section and holds the pin 11 from both sides of the pin 11. Because the pin 11 is held by the lever member 2 from both sides of the pin 11 in this way, it is possible to suppress backlash of the pin 11 when the movable contacts 4 and 6 move and it is possible to realize stabilization of the operation of the three-point disconnecting switch 51. Because the pin 11 is held by the lever member 2 from both sides of the pin 11, the pin 11 is less easily deformed. Therefore, it is possible to realize improvement of the durability of the three-point disconnecting switch 51 and realize stabilization of the operation of the three-point disconnecting switch 51.

Because the lever member 2 is formed in the C shape in section, it is possible to realize improvement of the strength of the lever member 2 itself. Consequently, it is possible to realize improvement of the durability of the three-point disconnecting switch 51 and cause the three-point disconnecting switch 51 to stably operate.

Fourth Embodiment

Figure 34:
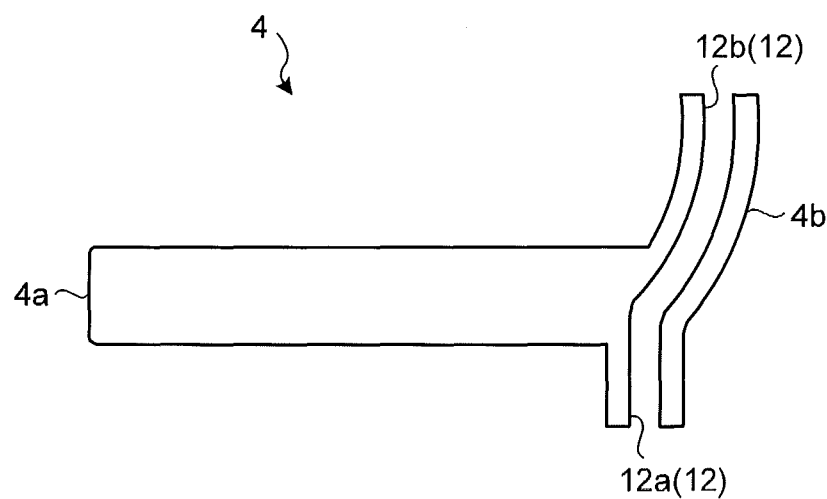
FIG. 34 is a diagram of a schematic configuration of a disconnecting-side movable contact included in a three-point disconnecting switch according to a fourth embodiment of the present invention.
Figure 35:
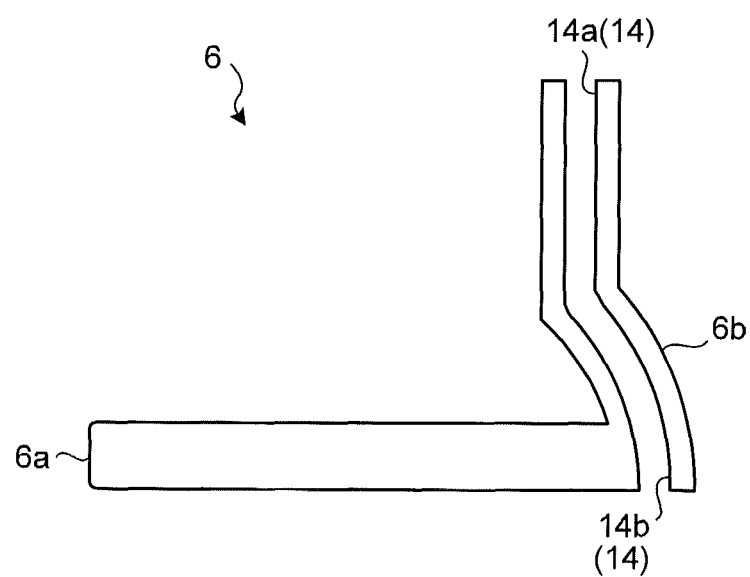
FIG. 35 is a diagram of a schematic configuration of an earth-side movable contact included in the three-point disconnecting switch according to the fourth embodiment of the present invention.
Figures 1, 36:
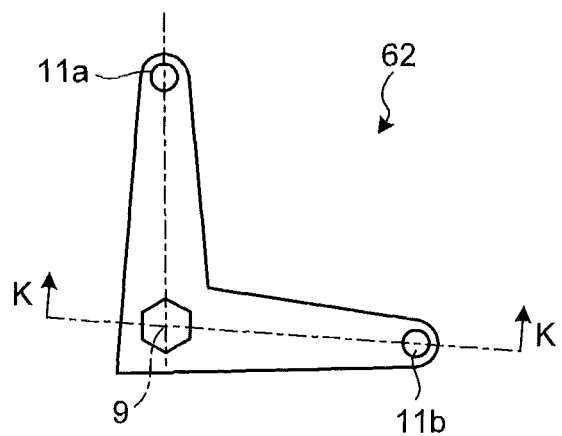
Figures 2, 36:
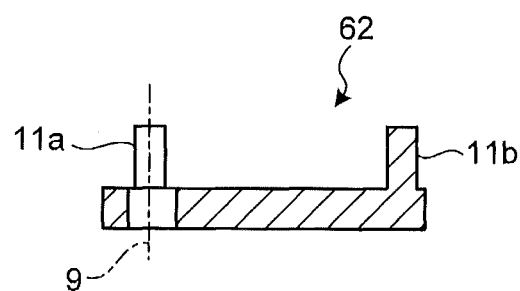
Figure 37:
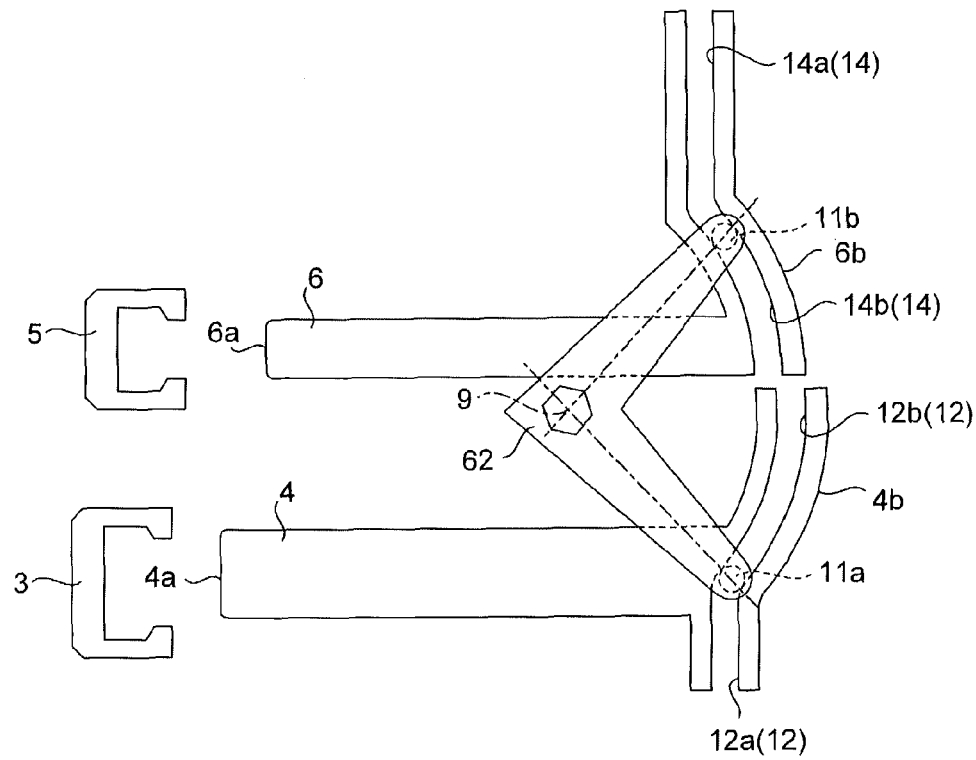
FIG. 37 is a diagram of a state in which the movable contacts and the lever member are incorporated in a container and a diagram of a state in which both of the disconnecting-side movable contact and the earth-side movable contact are separated from fixed contacts.
Figure 38:
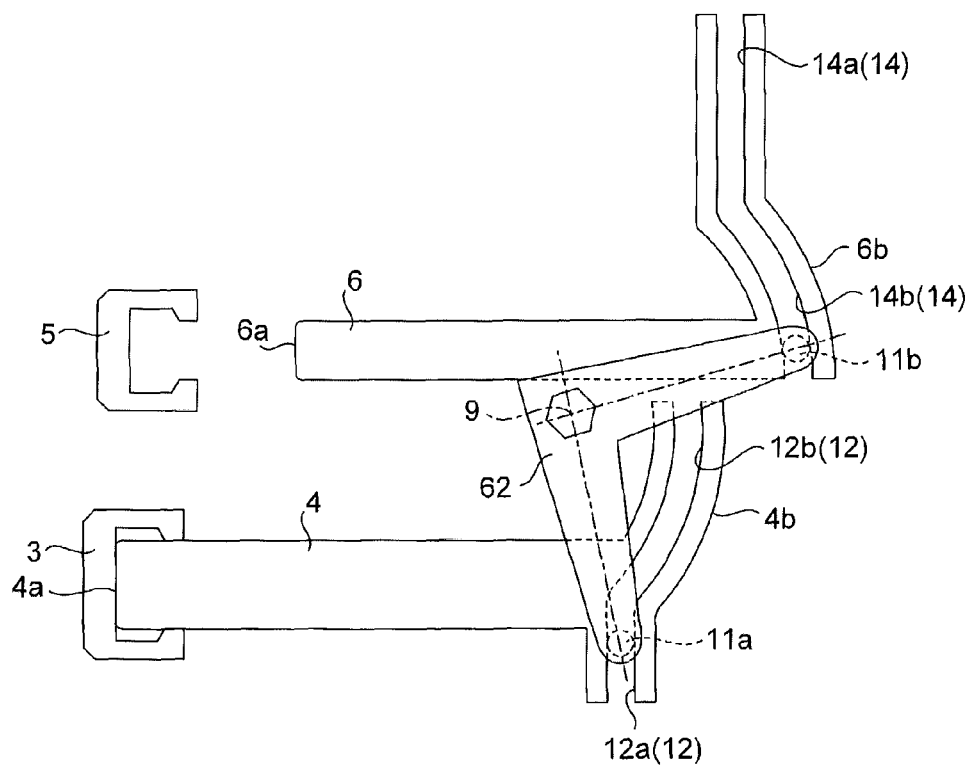
FIG. 38 is a diagram of a state in which the movable contacts and the lever member are incorporated in the container and a diagram of a state in which the disconnecting-side movable contact is in contact with a disconnecting-side fixed contact.
Figure 39:
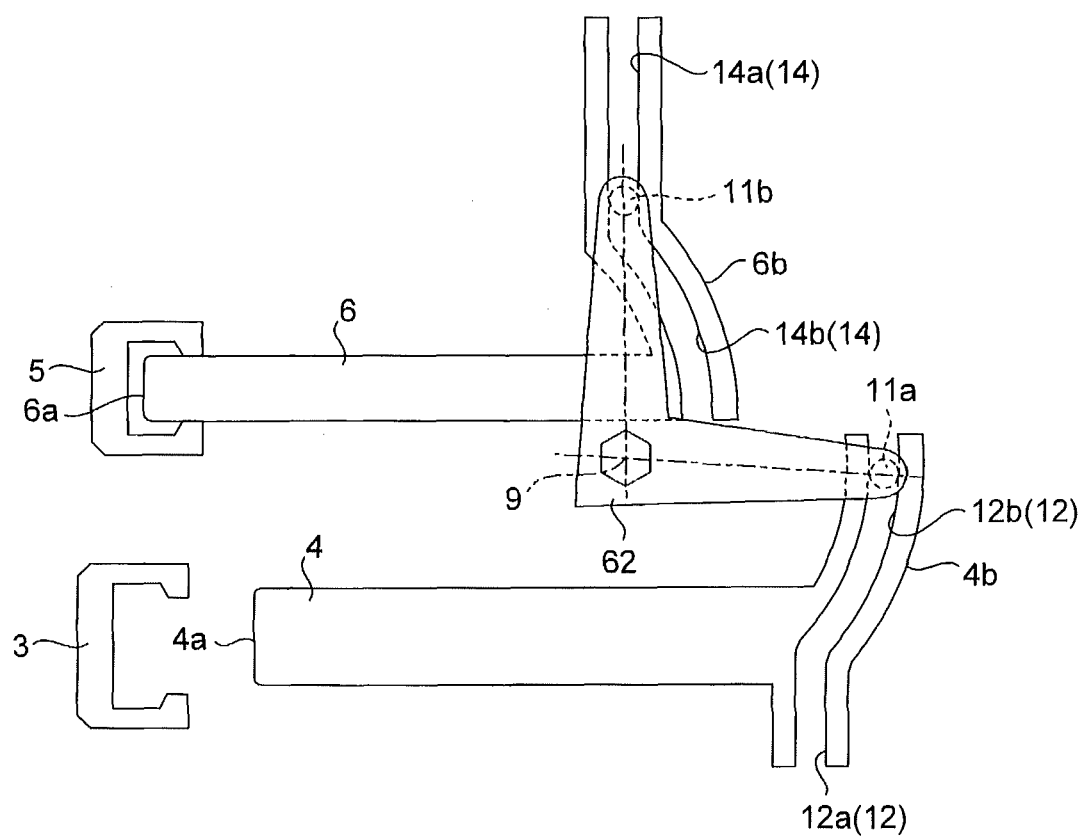
FIG. 39 is a diagram of a state in which the movable contacts and the lever member are incorporated in the container and a diagram of a state in which the earth-side movable contact is in contact with an earth-side fixed contact.

FIG. 34 is a plan sectional view of a schematic configuration of a three-point disconnecting switch according to a fourth embodiment of the present invention. FIG. 35 is a diagram of a schematic configuration of an earth-side movable contact included in the three-point disconnecting switch according to the fourth embodiment of the present invention. FIG. 36-1 is a diagram of a schematic configuration of a lever member included in the three-point disconnecting switch according to the fourth embodiment of the present invention. FIG. 36-2 is an arrow sectional view taken along line K-K shown in FIG. 36-1. FIG. 37 is a diagram of a state in which the movable contacts and the lever member are incorporated in a container and a diagram of a state in which both of the disconnecting-side movable contact and the earth-side movable contact are separated from fixed contacts. FIG. 38 is a diagram of a state in which the movable contacts and the lever member are incorporated in the container and a diagram of a state in which the disconnecting-side movable contact is in contact with a disconnecting-side fixed contact. FIG. 39 is a diagram of a state in which the movable contacts and the lever member are incorporated in the container and a diagram of a state in which the earth-side movable contact is in contact with an earth-side fixed contact. In the following explanation, components same as the components in the embodiments explained above are denoted by the same reference numerals and signs and detailed explanation of the components is omitted.

In the fourth embodiment, as shown in FIGS. 37 to 39, a moving direction of the disconnecting-side movable contact 4 in coming into contact with the disconnecting-side fixed contact 3 and a moving direction of the earth-side movable contact 6 in coming into contact with the earth-side fixed contact 5 are substantially the same directions.

The guide section 4b included in the disconnecting-side movable contact 4 and the guide section 6b included in the earth-side movable contact 6, i.e., the grooves 12 and 14 are formed in a shape different from the shape explained in the first embodiment. More specifically, the linear grooves 12a and 14a are formed in regions on the outer side of arcs drawn by the arcuate grooves 12b and 14b.

The disconnecting-side movable contact 4 and the earth-side movable contact 6 are arranged such that the grooves 12 and 14 respectively formed therein do not overlap. Therefore, one pin cannot be pierced through the two grooves 12 and 14. Therefore, as shown in FIGS. 36-1 and 36-2, a lever member 62 in the fourth embodiment assumes an L shape in plan view. Pins 11a and 11b are respectively formed at the distal ends of the lever member 62.

One pin 11a is fit in the groove 12 of the disconnecting-side movable contact 4 and the other pin 11b is fit in the groove 14 of the earth-side movable contact 6. The movable contacts 4 and 6 are moved by the two pins 11a and 11b.

Because the shape of the grooves 12 and 14 formed in the movable contacts 4 and 6 and the number of pins are changed in this way, it is possible to set moving directions of the movable contacts 4 and 6 different from the moving directions explained in the first embodiment and improve freedom of the arrangement of the movable contacts 4 and 6. In particular, when the movable contacts 4 and 6 are arranged apart from each other, if it is attempted to pierce one pin through both the grooves 12 and 14, in some case, the pin is long and sufficient strength cannot be obtained. On the other hand, in this embodiment, the separate pins 11a and 11b are respectively fit in the grooves 12 and 14. Therefore, it is possible to reduce the length of the pins 11a and 11b and easily secure the strength of the pins 11a and 11b. In this way, it is possible to realize further improvement of freedom of design of the internal configuration and the like of the three-point disconnecting switch.

In the fourth embodiment, it is possible to obtain an effect same as the effect in the first embodiment. That is, it is possible to select the DS input state and the ES input state as appropriate after selecting the neutral state by operating the insulating rod 8 to rotate the lever member 2. When the DS input state and the ES input state are changed, while one of the movable contacts 4 and 6 is moved by the pin 11a or 11b that passes the linear groove 12a or 14a, the pin 11a or 11b passes the arcuate groove 12b or 14b of the other movable contact 4 or 6 while hardly interfering with the sidewall of the arcuate groove 12b or 14b. Therefore, the disconnecting-side movable contact 4 and the earth-side movable contact 6 alternately move. It is possible to prevent, without providing a special device or mechanism, both of the disconnecting-side movable contact 4 and the earth-side movable contact 6 from simultaneously coming into contact with the fixed contacts 3 and 5.

It is possible to move the two movable contacts 4 and 6 by rotating the one lever member 2. Therefore, it is possible to realize a reduction in the number of components compared with the number of components including actuating mechanisms respectively provided in the movable contacts 4 and 6. According to the reduction in the number of components, it is possible to realize a reduction in the size of the three-point disconnecting switch.

Further, in the fourth embodiment, because the moving directions of the disconnecting-side movable contact 4 and the earth-side movable contact 6 are the same, it is possible to compactly arrange the disconnecting-side movable contact 4, the earth-side movable contact 6, the disconnecting-side fixed contact 3, and the earth-side fixed contact 5 and realize a further reduction in the size of the three-point disconnecting switch.

In changing the neutral state, the DS input state, and the ES input state, a user of the three-point disconnecting switch only has to operate the one insulating rod 8. Therefore, it is possible to realize improvement of convenience of use of the three-point disconnecting switch.

The movable contacts 4 and 6 are reciprocatingly moved to bring the contact sections 4a and 6a into contact with the fixed contacts 3 and 5. Therefore, positions where the movable contacts 4 and 6 and the fixed contacts 3 and 5 come into contact with each other can be separated from the rotation axis 9 of the lever member 2. When a rotating mechanism is included in the inside of the three-point disconnecting switch, from the viewpoint of, for example, a reduction in the size of a device, a configuration is often adopted in which a rotation axis is arranged in the center of the device and an insulator is arranged below the rotation axis.

In this case, if the positions where the movable contacts 4 and 6 and the fixed contacts 3 and 5 come into contact with each other are also arranged in the center in the three-point disconnecting switch, metal powder or the like formed by contact of the movable contacts 4 and 6 and the fixed contacts 3 and 5 drops onto the insulator and insulation performance of the three-point disconnecting switch is sometimes deteriorated. On the other hand, in the fourth embodiment, the positions where the movable contacts 4 and 6 and the fixed contacts 3 and 5 come into contact with each other can be separated from the rotation axis 9 of the lever member 2. Therefore, metal powder or the like less easily drops onto the insulator. It is possible to suppress the deterioration in the insulation performance.

When the neutral state, the DS input state, and the ES input state are changed, the pins 11a and 11b that move the movable contacts 4 and 6 move in the linear grooves 12a and 14a or the arcuate grooves 12b and 14b. That is, in a process for changing a state of the movable contacts 4 and 6, the pins 11a and 11b do not come off the grooves 12 and 14 formed in the movable contacts 4 and 6. Therefore, a malfunction of the movable contacts 4 and 6 less easily occurs. It is possible to stabilize the state and the movement of the movable contacts 4 and 6.

INDUSTRIAL APPLICABILITY

As explained above, the switch according to the present invention is suitable for a switch that alternately connects two contact points and is, in particular, suitable for a switch including a disconnecting switch and an earth switch.

REFERENCE SIGNS LIST 1 three-point disconnecting switch (switch)
2 lever member
3 disconnecting-side fixed contact
4 disconnecting-side movable contact (first movable contact)
4a contact section
4b guide section
5 earth-side fixed contact
6 earth-side movable contact (second movable contact)
6a contact section
6b guide section
8 insulating rod
9 rotation axis
10 container
11 pin
11a pin (first pin)
11b pin (second pin)
12 groove (first groove)
14 groove (second groove)
12a, 14a linear grooves
12b, 14b arcuate grooves
31 three-point disconnecting switch
51 three-point disconnecting switch
62 lever member
P, X, Y arrows

The invention claimed is:

1. A switch comprising:
a first fixed contact and a second fixed contact in a container in which an insulating gas is filled;
a first movable contact provided to be reciprocatingly movable with respect to the first fixed contact and configured to come into contact with and separate from the first fixed contact;
a second movable contact provided to be reciprocatingly movable with respect to the second fixed contact and configured to come into contact with and separate from the second fixed contact; and
a pin provided in the container and configured to move along an arcuate track,
wherein a first groove in which the pin is fit and is movable is formed in the first movable contact, and a second groove in which the pin is fit and is movable is formed in the second movable contact,
the first groove includes a linear groove linearly extending substantially perpendicularly to a moving direction of the first movable contact and substantially in parallel to a plane including a moving track of the pin and an arcuate groove that communicates with the linear groove and overlaps the moving track of the pin,
the second groove includes a linear groove linearly extending substantially perpendicularly to a moving direction of the second movable contact and an arcuate groove that communicates with the linear groove,
wherein when the pin moves on the arcuate track and passes the arcuate groove of the second groove of the second movable contact, the pin passes into the linear groove of the second groove of the second movable contact and into the arcuate groove of the first groove of the first movable contact, whereby the second movable contact reciprocatingly moves, and
when the pin moves on the arcuate track and passes the arcuate groove of the first groove of the first movable contact, the pin passes into the linear groove of the first groove of the first movable contact and into the arcuate groove of the second groove of the second movable contact, whereby the first movable contact reciprocatingly moves.

2. The switch according to claim 1, wherein a moving direction of the first movable contact in coming into contact with the first fixed contact and a moving direction of the second movable contact in coming into contact with the second fixed contact are substantially the same directions.

3. The switch according to claim 1, wherein a moving direction of the first movable contact in coming into contact with the first fixed contact and a moving direction of the second movable contact in coming into contact with the second fixed contact are different about 180 degrees.

4. The switch according to claim 1, wherein a moving direction of the first movable contact in coming into contact with the first fixed contact and a moving direction of the second movable contact in coming into contact with the second fixed contact are different about 90 degrees.

5. The switch according to claim 1, further comprising a lever member configured to move the pin, wherein
the lever member assumes a C shape in section and holds the pin from both ends of the pin, and
the first movable contact and the second movable contact are provided in the lever member.

6. The switch according to claim 1, further comprising a lever member configured to move the pin, wherein
the pin is formed to project to both sides of the lever member, and
the lever member is provided between the first movable contact and the second movable contact.

7. The switch according to claim 1, wherein the first fixed contact and the first movable contact are arranged in positions where the first fixed contact and the first movable contact come into contact with each other when a tangential direction of the moving track of the pin moving in the linear groove of the first movable contact substantially coincides with a moving direction of the first movable contact, and
the second fixed contact and the second movable contact are arranged in positions where the second fixed contact and the second movable contact come into contact with each other when a tangential direction of the moving track of the pin moving in the linear groove of the second movable contact substantially coincides with a moving direction of the second movable contact.

* * * * *